US006766962B2

(12) United States Patent
Paul et al.

(10) Patent No.: US 6,766,962 B2
(45) Date of Patent: Jul. 27, 2004

(54) TEMPERATURE MAINTAINING APPARATUS AND TEMPERATURE CONTROL APPARATUS AND METHOD THEREFOR

(75) Inventors: Douglas Thompson Paul, Vancouver (CA); Jonathan Young, Vancouver (CA); Angelo Faccone, Vancouver (CA)

(73) Assignee: Teleflex Canada Limited Partnership, Richmond (CA)

( * ) Notice: Subject to any disclaimer, the term of this patent is extended or adjusted under 35 U.S.C. 154(b) by 0 days.

(21) Appl. No.: 10/195,145

(22) Filed: Jul. 15, 2002

(65) Prior Publication Data

US 2004/0007628 A1 Jan. 15, 2004

(51) Int. Cl.[7] .......................... G05D 15/00; G05D 23/00
(52) U.S. Cl. ..................... 236/78 D; 237/2 A; 165/269; 700/14
(58) Field of Search ........................... 62/231; 165/269, 165/78 D; 236/46 F, 1 EB; 700/14; 237/2 A

(56) References Cited

U.S. PATENT DOCUMENTS

| | | | |
|---|---|---|---|
| 3,362,637 A | 1/1968 | Cornell | 237/2 |
| 3,577,877 A | 5/1971 | Warne | 60/39.14 |
| 3,847,537 A | 11/1974 | Velie | 431/347 |
| 3,947,218 A | 3/1976 | Landis | 431/79 |
| 4,010,895 A | 3/1977 | Kofink | 237/12.3 C |

(List continued on next page.)

FOREIGN PATENT DOCUMENTS

EP 0 328 418 8/1989 ........... F27D/23/00

*Primary Examiner*—William Wayner
(74) *Attorney, Agent, or Firm*—Norman M. Cameron

(57) ABSTRACT

A method and apparatus are provided for maintaining a temperature between a first value and a second value. The method and apparatus utilize a heat transfer device capable of cycling through a series of cycles, the device being capable of changing the temperature from the second value to the first value when operational. During each cycle the device transfers heat for a first period of time when the temperature reaches the second volume until the first value is reached and thereafter the device stops transferring heat. The first period of time is compared to a desired cycle-on period of time during each cycle and the second temperature value then is adjusted for a subsequent cycle of the device so the first period of time when the device transfers heat approaches the desired cycle-on period of time. There may also be provided temperature controls for a liquid heater having a jacket containing the liquid. The jacket has an inner heated wall and an outer wall spaced apart from the inner wall. The controls include a temperature sensor capable of fitting to the jacket so that the sensor contacts the inner wall and the liquid. A control module monitors temperature sensed by the temperature sensor. The control module causes the heater to stop heating when the temperature is heated by the heater to a first value and causes the heater to heat when the liquid cools to a second value lower than the first value. The control module senses overheating when temperature sensed by the sensor increases to a third value, higher than the first value, when the heater is not heating, and then causes the heater to shut down.

36 Claims, 27 Drawing Sheets

U.S. PATENT DOCUMENTS

| | | | |
|---|---|---|---|
| 4,149,842 A | 4/1979 | Benjamin | 431/118 |
| 4,223,692 A | 9/1980 | Perry | 137/78.4 |
| 4,340,362 A | 7/1982 | Chalupsky | 432/222 |
| 4,431,382 A | 2/1984 | Edman | 417/302 |
| 4,508,264 A | 4/1985 | Takeda | 237/12.3 B |
| 4,519,772 A | 5/1985 | Mittmann | 431/45 |
| 4,682,649 A | 7/1987 | Greer | 165/43 |
| 4,700,888 A | 10/1987 | Samulak | 237/2 A |
| 4,718,600 A | 1/1988 | Adam | 237/2 A |
| 4,718,602 A | 1/1988 | Beck | 237/32 |
| 4,759,498 A * | 7/1988 | Levine et al. | 236/46 R |
| 4,852,797 A | 8/1989 | Goerlich | 237/2 A |
| 4,858,825 A | 8/1989 | Kawamura | 237/2 A |
| 4,905,893 A | 3/1990 | Kiskis | 237/2 A |
| 4,927,077 A | 5/1990 | Okada | 237/2 A |
| 4,934,593 A * | 6/1990 | Meyer | 236/78 D |
| 4,940,041 A | 7/1990 | Riedmaier | 126/110 R |
| 5,012,070 A | 4/1991 | Reed | 219/202 |
| 5,014,910 A | 5/1991 | Koch | 237/2 A |
| 5,025,985 A | 6/1991 | Enander | 237/2 A |
| 5,046,663 A | 9/1991 | Bittmann | 237/12.3 C |
| 5,080,580 A | 1/1992 | Clapp | 431/232 |
| 5,211,193 A | 5/1993 | Young | 137/590 |
| 5,211,333 A | 5/1993 | Schmalenbach | 237/2 A |
| D344,089 S | 2/1994 | Wilnechenko | D9/432 |
| 5,413,279 A | 5/1995 | Quaas | 237/12.3 C |
| 5,527,180 A | 6/1996 | Robinson | 431/258 |
| 5,692,676 A * | 12/1997 | Walker | 237/8 R |
| 5,878,950 A | 3/1999 | Faccone | 237/12.3 C |
| 5,927,961 A | 7/1999 | Robinson | 431/207 |
| 6,082,625 A | 7/2000 | Faccone | 237/12.3 C |
| 6,450,801 B1 | 9/2002 | Wilnechenko | 431/90 |

\* cited by examiner

TEMPERATURE MAINTAINING APPARATUS AND TEMPERATURE CONTROL APPARATUS AND METHOD THEREFOR

BACKGROUND OF THE INVENTION

This invention relates to temperature maintaining apparatuses such as transit vehicle heaters and temperature control apparatuses and methods therefor.

Various temperature maintaining apparatuses, particularly heaters, operate in a cyclic fashion. When the temperature reaches a certain threshold, such apparatuses operate for a period of time until the temperature is brought to a certain level and thereafter the apparatus becomes nonoperational until the threshold is reached again. For example, in a heater the temperature may be the temperature of a fluid and the heater operates when the temperature of the fluid drops to a set lower value. The heater continues to operate until the temperature is raised to a higher level at which time the heater switches off until the temperature again drops to the lower level.

One specific type of heater is a transit vehicle heater which operates to heat the engine coolant. The temperature of the coolant is sensed by at least one temperature sensor and the heater, typically operating on diesel fuel, is fired until the temperature of the coolant is raised to a higher level. At this point the heater switches off.

This cycling on and off between preset lower and higher temperatures produces less than satisfactory performance under some conditions. People in a transit vehicle, for example, may perceive that the temperature of the air in the vehicle drops to an uncomfortable level when the heater cycles on and off between preset lower and upper temperatures. This is because too much time may occur near the bottom of the cycle when the temperature is low and/or because the mean temperature is reduced below optimum levels. Standard on/off temperature controls or thermostats are not capable of adjusting themselves to such a situation.

Transit vehicle heaters, as well as some other types of heaters for liquids, conventionally employ two different temperature sensors. One of the sensors contacts the liquid, typically a water/anti-freeze mixture in the case of a transit vehicle heater, to determine the temperature of the liquid in order to cycle the heater on and off as required to maintain the temperature of the liquid. A second sensor contacts the inner wall of the jacket to sense an overheat condition. The need for two different sensors increases the cost and complexity of the units.

Transit vehicle heaters, and other types of heaters often must be installed in different configurations. For example, in the case of transit vehicle heaters, the direction of flow of liquid through the heaters sometimes must be reversed according to the plumbing requirements of a particular vehicle. Conventional transit vehicle heaters do not readily adapt to a reversal of liquid flow because of temperature sensors placed adjacent the fluid inlet and fluid outlet. The heater controls are adversely affected when the fluid flow is reversed because of the effect this has on the readings of the sensors.

Also some conventional heaters require two sensors adjacent the fluid inlet and fluid output respectively and cannot operate with a single sensor or with one of the sensors disabled. The controls have a lack of flexibility in this respect.

It is an object of the invention to provide an improved heat transfer device, such as a transit vehicle heater, as well as controls therefor and a method of maintaining a temperature, which are capable of adapting to different temperature conditions to maintain a more constant mean temperature compared to a simple system where the device cycles on and off at fixed temperatures.

It is another object of the invention to provide an improved heater for liquids, a method of controlling temperatures for liquids and a temperature control apparatus where a single sensor can act both to measure temperatures of the liquids to determine when the heater cycles on and off, and also acts as an overheat sensor for the heater.

It is a further object of the invention to provide an improved heater for liquids, a method of controlling such heaters and control systems for such heaters which are adaptable to varying installation requirements, such as reversing the flow of liquids through the heaters.

It is still further object of the invention to provide an improved heater for liquids, a method of controlling such heaters and a control systems for such heaters which can operate with two temperature sensors, with one of the sensors removed or with one of the sensors disabled.

SUMMARY OF THE INVENTION

There is provided, according to a first aspect of the invention, a method of maintaining a temperature between a first temperature value and a second, variable temperature value, the method utilizing a heat transfer device capable of cycling through a series of cycles. The device is capable of changing the temperature from the second value to the first value when operational. During each said cycle the device transfers heat for a first period of time when the temperature reaches the second value until the first value is reached and thereafter the device ceases to transfer heat. The first period of time is compared to a desired cycle-on period of time during each said cycle and said second value then is adjusted for a subsequent cycle of the device so said first period of time when the device transfers heat approaches said desired cycle-on period of time.

There is provided, according to a second aspect of the invention, an apparatus for maintaining a temperature between a first temperature value and a second temperature value. The apparatus includes a heat transfer device capable of cycling through a series of cycles. The device is capable of changing the temperature from the second value to the first value when operational. There are controls which control the device so during each said cycle the device transfers heat for a first period of time when the temperature reaches the second temperature value until the first value is reached and thereafter the device ceases transferring heat. The controls compare the first period of time to a desired cycle-on period of time during each said cycle and said controls adjust the second temperature value for a subsequent cycle of the device so said first period of time when the device transfers heat approaches said desired cycle-on period of time.

There is provided, according to a third aspect of the invention, a heater for a liquid including controls for maintaining a temperature of the liquid between a first value and a second lower value, the heater being capable of cycling through a series of cycles. The controls control the heater so during each said cycle the heater heats for a first period of time when the liquid cools to the second temperature value until the liquid is heated to the first value and thereafter the heater stops heating. The controls compare the first period of time to a desired cycle-on period of time during each said cycle and said controls adjust the second temperature value for a subsequent cycle of the device so said first period of time when the heater heats approaches said desired cycle-on period of time.

There is provided, according to a fourth aspect of the invention, a control system for a heat transfer device, the control system maintaining a temperature between a first value and a variable second value. The heat transfer device is capable of cycling through a series of cycles. The device is capable of changing the temperature from the second value to the first value. The control system controls the device so during each said cycle the device transfers heat for a first period of time when the temperature reaches the second temperature value until the first value is reached and thereafter the device stops transferring heat. The controls compare the first period of time to a desired cycle-on period of time during each said cycle and said control system adjusts the second temperature value for a subsequent cycle of the device so said first period of time when the device transfers heat approaches said desired cycle-on period of time.

There is provided, according to a fifth aspect of the invention, temperature controls for a liquid heater having a jacket containing the liquid. The jacket has an inner heated wall and an outer wall spaced apart from the inner wall. The controls include a temperature sensor capable of fitting to the jacket so that the sensor contacts the inner wall and the liquid. A control module monitors temperature sensed by the temperature sensor. The control module causes the heater to become nonoperational when the temperature is heated by the heater to a first value and causes the heater to operate when the liquid cools to a second value lower than the first value. The control module senses overheating when temperature sensed by the sensor increases to a third value, higher than the first value, when the heater is nonoperational, and then causes the heater to shut down.

There is provided, according to a sixth aspect of the invention, a heater for a liquid, the heater having a jacket containing the liquid. The jacket has an inner heated wall and an outer wall spaced apart from the inner wall. Temperature controls are operatively connected thereto, the controls including a temperature sensor capable of fitting to the jacket so that the sensor contacts the inner wall and the liquid, and a control module which monitors temperature sensed by the temperature sensor. The control module causes the heater to stop heating when the temperature is heated by the heater to a first temperature value and causes the heater to heat when the liquid cools to a second temperature value. The control module senses overheating when a temperature sensed by the sensor increases to a third temperature value, higher than the first temperature value, when the heater is not heating, and then causes the heater to shut down.

There is provided, according to a seventh aspect of the invention, a method of controlling temperature for a liquid heater having a jacket containing the liquid. The jacket has an inner heated wall and an outer wall spaced apart from the inner wall. The method includes fitting a temperature sensor to the jacket so that the sensor contacts the inner wall and the liquid, monitoring temperature sensed by the temperature sensor, causing the heater to stop heating when the temperature is heated by the heater to a first temperature value and causing the heater to heat when the liquid cools to a second temperature value lower than the first value, detecting when temperature sensed by the sensor increases to a third value, higher than the first value, when the heater is not heating, treating said third value as an overheat condition and then causing the heater to shut down.

There is provided, according to an eighth aspect of the invention, a temperature control apparatus for a liquid heater having two fittings for connecting liquid conduits to the heater, one of the fittings being either an inlet or an outlet for liquid, another of the fittings being another of the inlet or outlet for the liquid. The heater has a first temperature sensor adjacent to said one fitting and a second temperature sensor adjacent to said another fitting. The apparatus includes a memory having values for a first temperature value, where the heater stops heating, a second temperature value where the heater commences heating, and a third temperature value, higher than the first value, where the heater is shut off. Both sensors are capable of sensing the first temperature value and the second temperature value and one of the sensors also senses the third temperature value. Controls compare temperature readings from each of the sensors with each of the first temperature value, the second temperature value and the third temperature value. The heater has an overheat condition when a temperature exceeds the third temperature value, a high condition when a temperature exceeds the first temperature value, a normal condition when a temperature is between the second temperature value and the first temperature value and a low condition when a temperature is less than the second temperature value. The apparatus indicates the overheat condition when one of the sensors indicates a temperature exceeding the third temperature value, the high condition when either sensor indicates a temperature exceeding the first temperature value, but neither sensor indicates a temperature exceeding the third temperature value, the normal condition when either sensor indicates a temperature exceeding the second temperature value, but neither sensor indicates a temperature exceeding the third temperature value, and a low condition when both sensors indicate temperatures less than the second temperature value.

There is provided, according to a ninth aspect of the invention, a method of controlling temperatures in a liquid heater having two fittings for connecting liquid conduits to the heater, one of the fittings being either an inlet or an outlet for liquid, another of the fittings being another of the inlet or the outlet for the liquid. The heater has a first temperature sensor adjacent to said one fitting and a second temperature sensor adjacent to said another fitting. The method includes retaining values for a first temperature, where the heater stops heating, a second temperature where the heater commences heating, and a third temperature where the heater is shut off, both sensors being capable of sensing the first temperature value and the second temperature value and one of the sensors also sensing the third temperature value, comparing temperature readings from each of the sensors with each of the second temperature value, the first temperature value and the third temperature value. The heater has an overheat condition when a temperature exceeds the third temperature value, a high condition when a temperature exceeds the first temperature value, a normal condition when a temperature is between the second temperature value and the first temperature value and a low condition when a temperature is less than the second temperature value. The overheat condition is indicated when one of the sensors indicates a temperature exceeding the third temperature value, the high condition when either sensor indicates a temperature exceeding the first temperature value, but neither sensor indicates a temperature exceeding the overheat temperature, the normal condition when either sensor indicates a temperature exceeding the second temperature value, but neither sensor indicates a temperature exceeding the first temperature value, and a low condition when both sensors indicate temperatures less than the second temperature value.

There is provided, according to a tenth aspect of the invention, a temperature control apparatus for a liquid heater having a first temperature sensor and a second temperature sensor, the apparatus including a memory having values for a first temperature, where the heater stops heating, a second temperature where the heater commences heating, and a third temperature where the heater is shut off, and controls which compare temperature readings from each of the sensors with each of the first temperature value, the second temperature value and the third temperature value. Both sensors are capable of sensing the first temperature value and the second temperature value and one of the sensors also senses the third temperature value. The heater has an overheat condition when a temperature exceeds the third temperature value, a high condition when a temperature exceeds the first temperature value, a normal condition when a temperature is between the first temperature value and the second temperature value and a low condition when a temperature is less than the second temperature value. The apparatus indicates the overheat condition when one of the sensors indicates a temperature exceeding the third temperature value, the high condition when either sensor indicates a temperature exceeding the first temperature value, but neither sensor indicates a temperature exceeding the third temperature value, the normal condition when either sensor indicates a temperature exceeding the second temperature value, but neither sensor indicates a temperature exceeding the first temperature value, and a low condition when both sensors indicate temperatures less than the second temperature value.

There is provided, according to an eleventh aspect of the invention, a method of controlling temperatures in a liquid heater, the heater having a first temperature sensor and a second temperature sensor, the method including retaining values for a first temperature value, where the heater stops heating, a second temperature value where the heater commences heating, and a third temperature value where the heater is shut off. Both sensors are capable of sensing the first temperature value and the second temperature value and one of the sensors also senses the third temperature value. Temperature readings from each of the sensors are compared with each of the first temperature value, the second temperature value and the third temperature value. The heater has an overheat condition when a temperature exceeds the third temperature value, a high condition when a temperature exceeds the first temperature value, a normal condition when a temperature is between the first temperature value and the second temperature value and a low condition when a temperature is less than the second temperature value. The overheat condition is indicated when one of the sensors indicates a temperature exceeding the third temperature value, the high condition when either sensor indicates a temperature exceeding the first temperature value, but neither sensor indicates a temperature exceeding the third temperature value, the normal condition when either sensor indicates a temperature exceeding the second temperature value, but neither sensor indicates a temperature exceeding the first temperature value, and a low condition when both sensors indicate temperatures less than the second temperature value.

There is provided, according to a twelfth aspect of the invention, a method of detecting a temperature sensor error in a heater for a liquid including a temperature sensor and controls for maintaining a temperature of the liquid between a first value and a second lower value, the heater being capable of cycling through a series of cycles. The controls control the heater so during each said cycle the heater commences heating when the temperature sensor indicates that the temperature has decreased to the lower value, the controls indicating a temperature sensor error if the temperature indicated by the sensor does not increase by a specified amount within a specified time after the heater commences heating.

The invention offers significant advantages compared to the prior art, particularly prior art heaters and other heat transfer devices which control temperature by switching on and off at fixed temperature values. By comparison the invention allow such a device to adapt to changing ambient conditions. If temperatures fall, then a heating device, for example, tends to operate longer until the temperature reaches a set upper value. This lengthened period of time is sensed by the invention and the temperature where the heater becomes operational is raised. This typically causes the heater to cycle on and off at an increased frequency. The effect is to maintain the mean temperature and give an increased degree of comfort compared with a conventional system.

At the same the invention allows such heat transfer devices to adapt in other ways. For example, a prolonged period of cooling may be sensed and the heater may be turned on even though the temperature has not fallen to a value which would normally trigger operation of the heater. This again maintains a minimum mean temperature and increases the degree of comfort.

The invention also permits a single temperature sensor to replace two different temperature sensors normally used for temperature regulation and for sensing an overheat condition. This reduces the number of parts required for devices such as transit heaters and simplifies assembly.

The invention offers significant advances and increases adaptability of various heat transfer devices such as heaters and hot liquid transit heaters in particular. For example, where such a heater has two different heat sensors the system can operate without information on which sensor is which or in which direction liquid flows through the heater. Moreover, if one sensor is removed, or one becomes faulted, then the system can adapt and still operate correctly.

BRIEF DESCRIPTION OF THE DRAWINGS

In drawings which illustrate embodiment so the invention:

FIG. 3a is a phantom view of the control module assembly of FIG. 3 shown in an alternative position rotated 18020 from the position of FIG. 3;

DETAILED DESCRIPTIONS OF THE PREFERRED EMBODIMENTS

Figure 1:
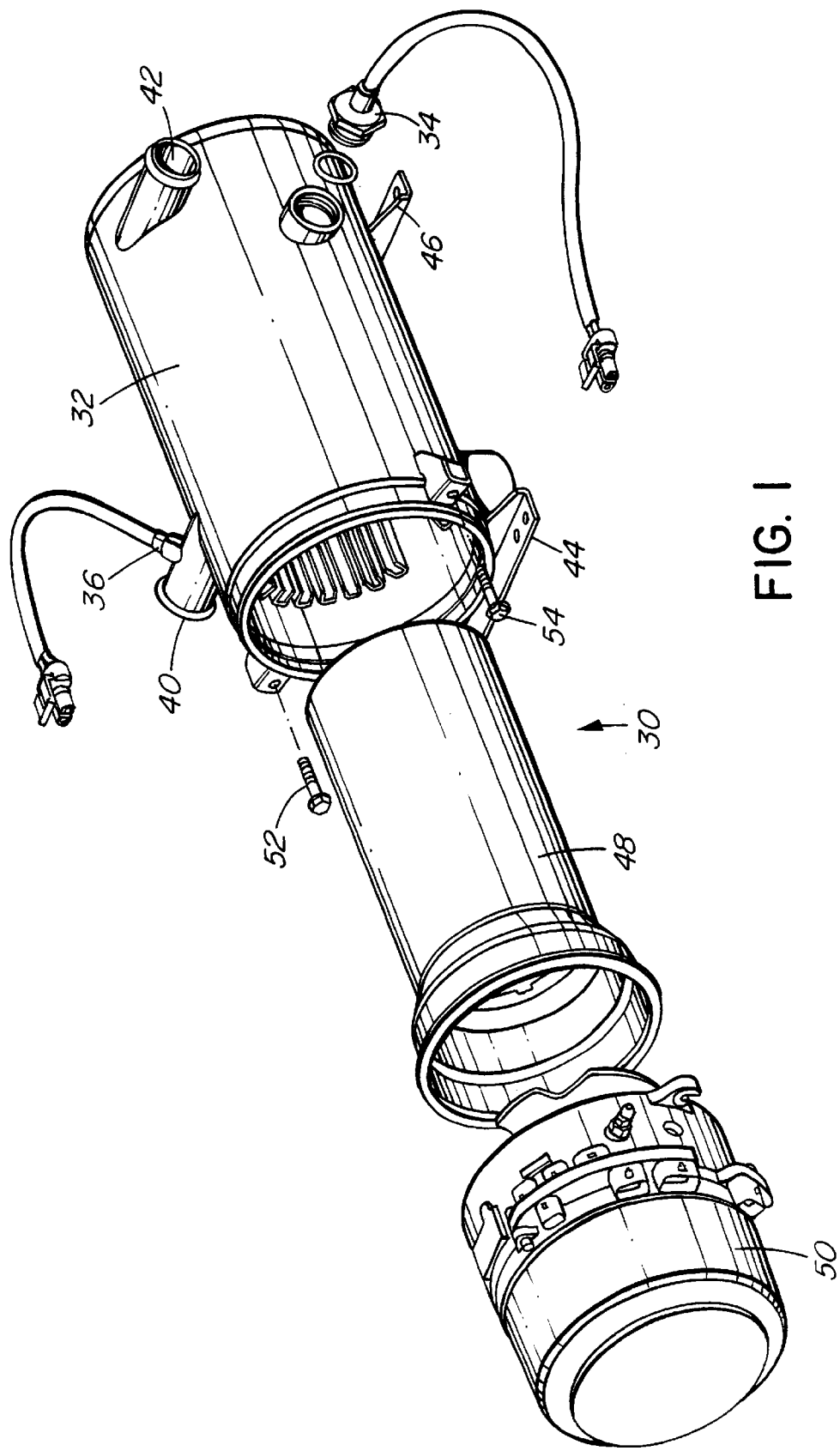
FIG. 1 is an exploded isometric view of a transit heater according to an embodiment of the invention.

Referring to the drawings, and first to FIG. 1, this shows a transit heater 30 according to an embodiment of the invention. The heater include a heat exchanger 32 equipped with a primary temperature sensor 34 and a secondary temperature sensor 36. The latter is optional as described below. There are fittings 40 and 42 which serve as inlets and outlets for liquid, a mixture of water and anti-freeze being the usual liquid for a transit vehicle heater. Mounting brackets 44 and 46 are connected to the heat exchanger for mounting the heater on a transit vehicle or similar application. A combustion tube 48 fits within the heat exchanger and a burner head assembly 50 fits over the combustion tube. The assembly is secured to the heat exchanger by bolts 52 and 54.

Figure 2:
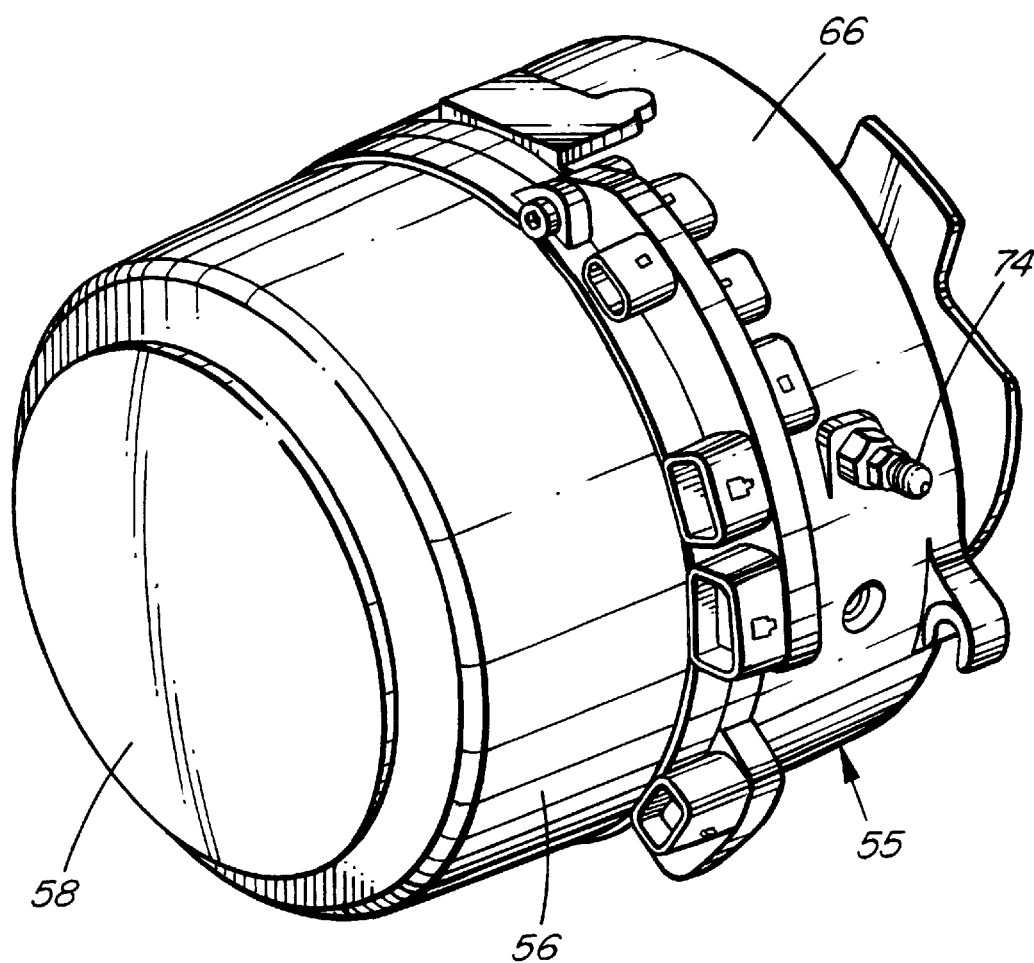
FIG. 2 is an enlarged front, side isometric view of the burner head assembly thereof.
Figure 3:
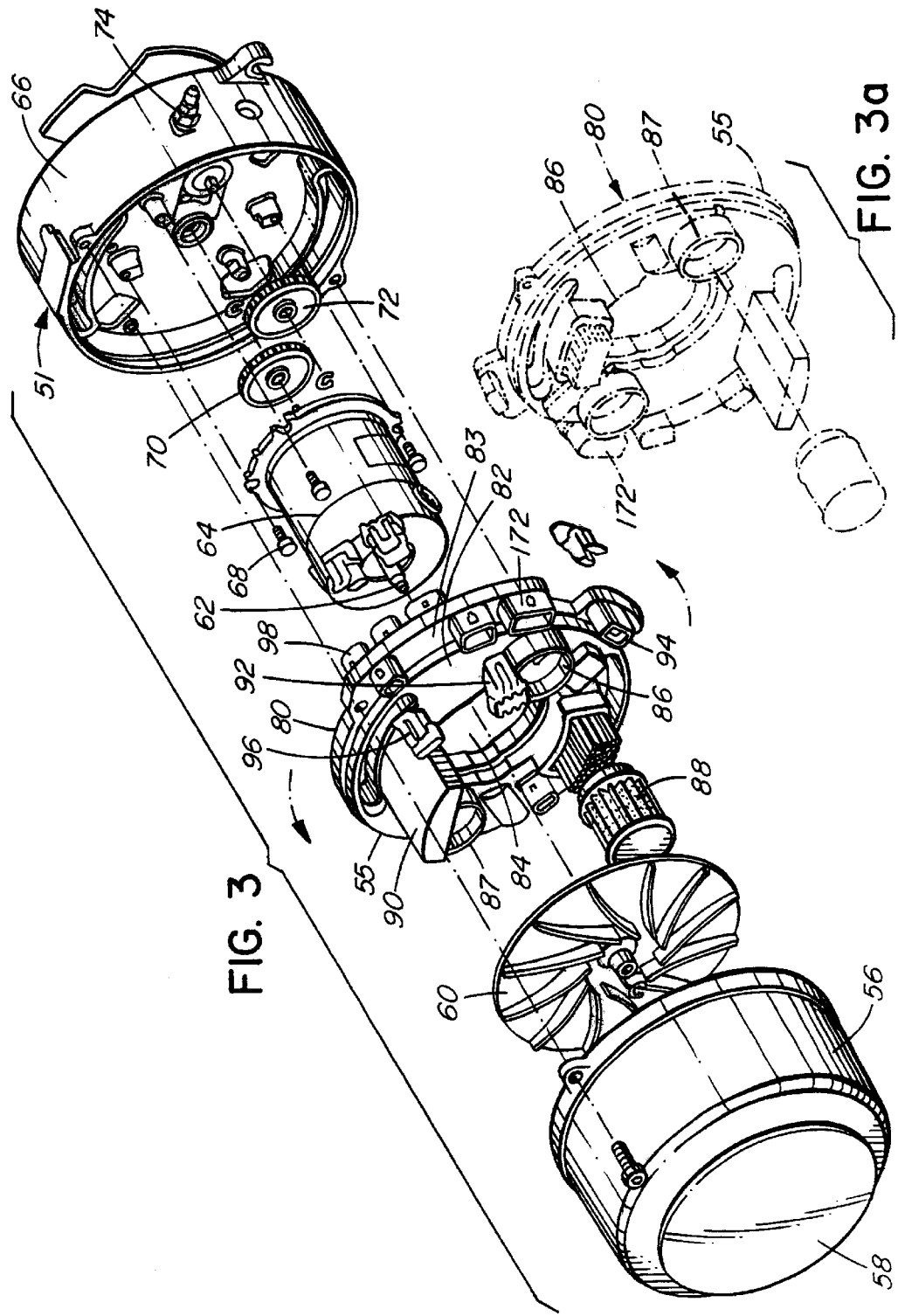
FIG. 3 is an exploded, isometric view thereof.
Figure 20:
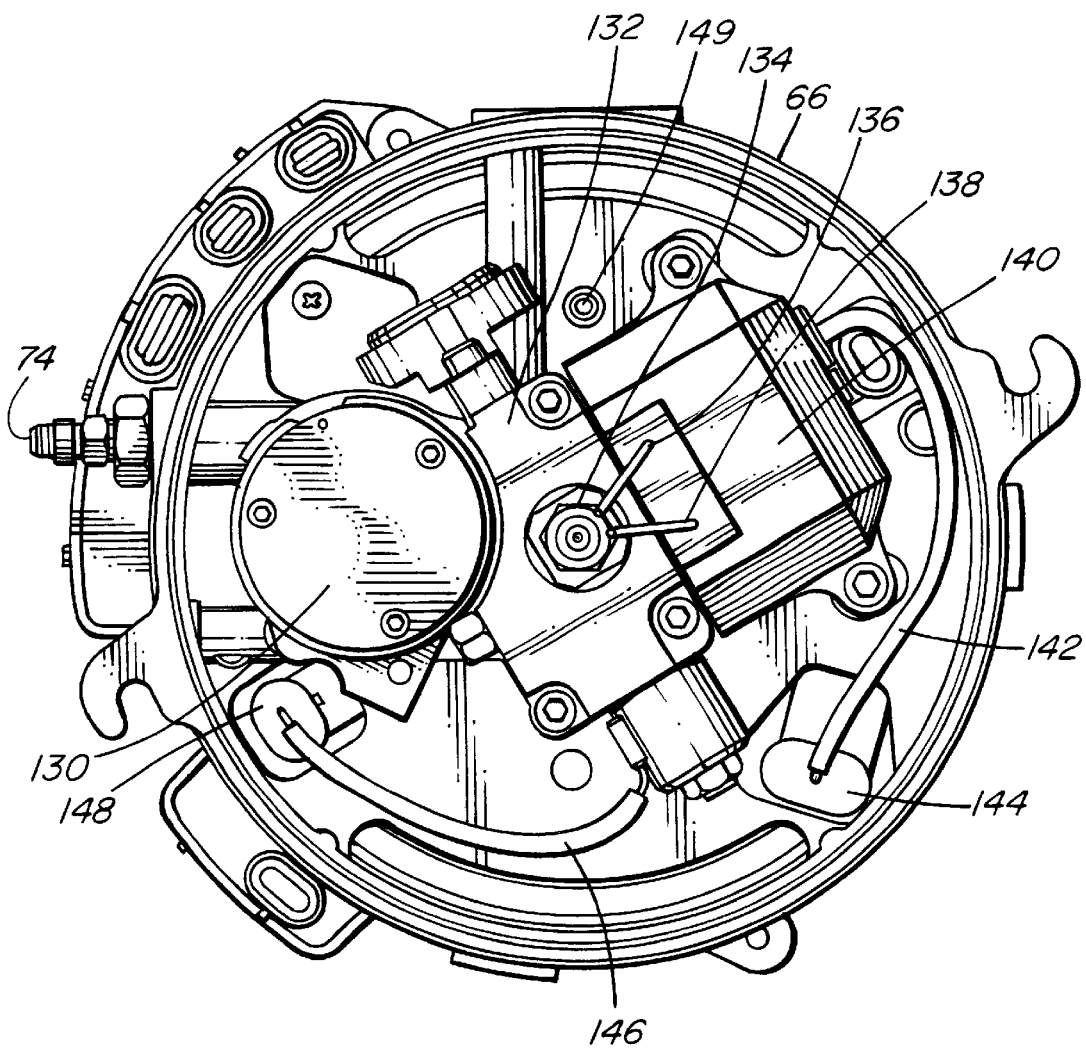
FIG. 20 is a rear, elevational view of the burner head assembly showing the burner, fuel pump, compressor and associated transformer.

The burner head assembly is shown in better detail in FIGS. 2 and 3. The assembly includes a burner head assembly housing 51, cylindrical in this example, having two portions, a blower housing 56 and a head flange assembly housing 66. The blower housing 56 has a splash guard 58 connected thereto. There is an air intake behind the splash guard. A blower 60 is mounted on shaft 62 of electrical motor 64. Burner head flange assembly housing 66 is at the end of the burner head assembly opposite blower housing 56. The motor is mounted on the inside of the flange assembly housing 66 by means of bolts 68. A gear 70 is mounted on the shaft of the motor and engages another gear 72 which drives a compressor 130 and a fuel pump 131 on the opposite side of the head flange assembly housing as seen in FIG. 20. There is a fitting 74 for connecting a fuel line to the fuel pump.

Referring again to FIG. 20, there is a burner 132 having a nozzle 134 provided with ignitors 136 and 138. The ignitors are connected to transformer 140 which receives electrical current through cable 142 connected to internal electrical connector 144. Cable 146 and internal electrical connector 148 are provided for the fuel solenoid valve.

Figure 21:
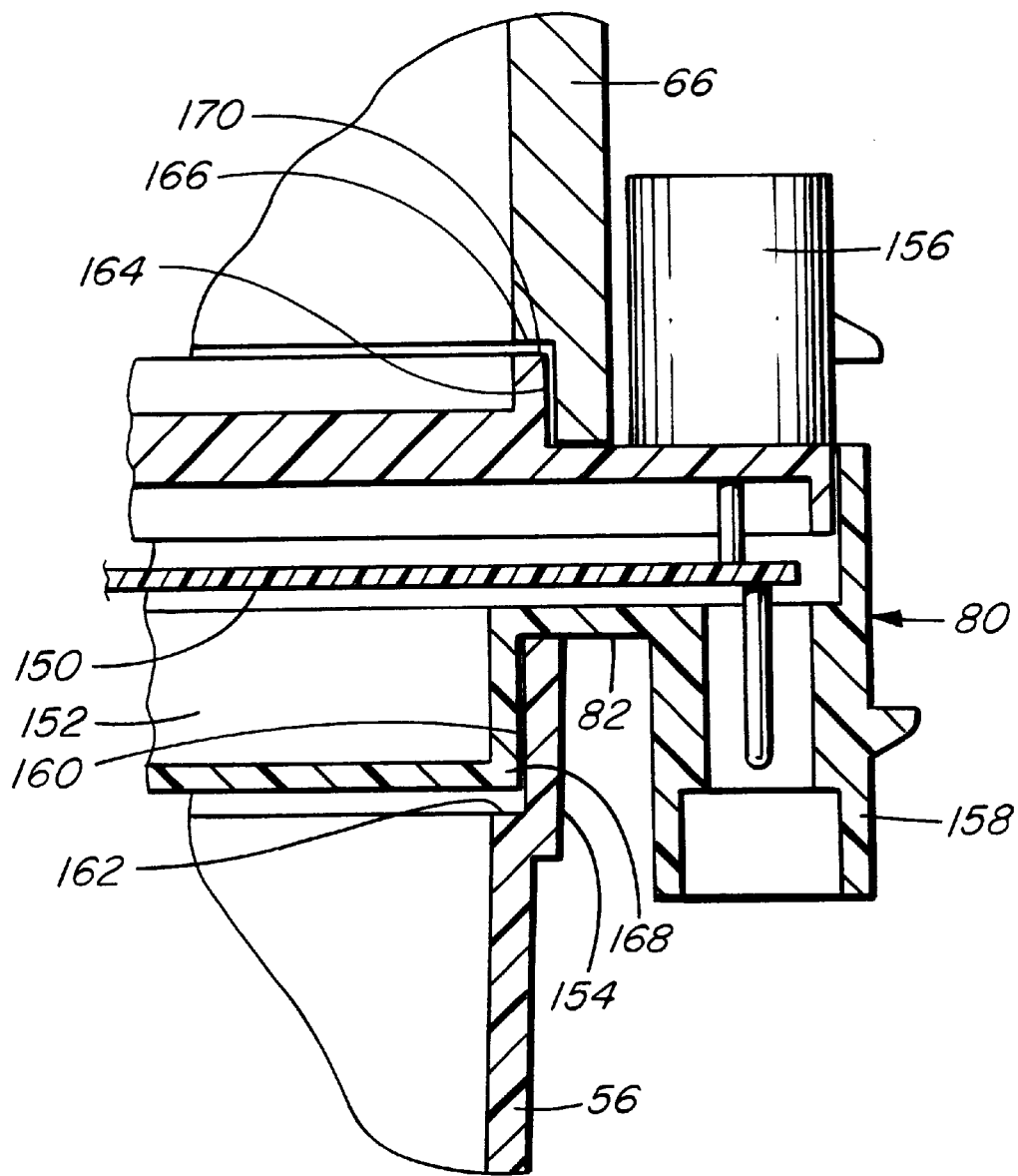
FIG. 21 is a fragmentary sectional view showing two portions of the housing with the control module fitted therebetween and the circuit board of the module extending outwardly to connect with two electrical sockets.

Control module assembly 80, shown in FIG. 3, fits between the two portions of the burner head assembly housing 51, namely head flange assembly housing 66 and blower housing 56. The assembly includes an annular member, or module housing 82, having a central aperture 84 which fits over the motor. The module housing 82 has a circular outer surface 83 which is adjacent to the exterior of the burner head assembly housing. As seen in FIG. 21, the housing 56 has an annular recess 160 provided with a shoulder 162 while housing 66 has a corresponding recess 164 and shoulder 166. The control module has shoulders 168 and 170 which butt against the shoulders 162 and 166 to provide a sealing fit between the control module and the burner head assembly housing.

There is a first cylindrical socket or mount 86 for receiving air filter 88 as seen in FIG. 3. Likewise there is a second cylindrical socket or mount 87 for receiving the air filter when the control module is rotated 180° as shown in FIG. 3a. A circuit board 150 is located within housing 82 as shown in FIG. 21. As shown in FIG. 3, a temperature sensor plug 92 is received within a socket 98. There is also an auxiliary plug 96 and a socket 94 for receiving a data link plug.

Referring to FIGS. 3 and 3a, the control module assembly 80 can be rotated 180° to an alternate position. This is done so that the external electrical connectors, such as connector 172, can be rotated to one side or the other of the housing 51 according to the requirements of the vehicle where the heater is being installed.

Figure 15:
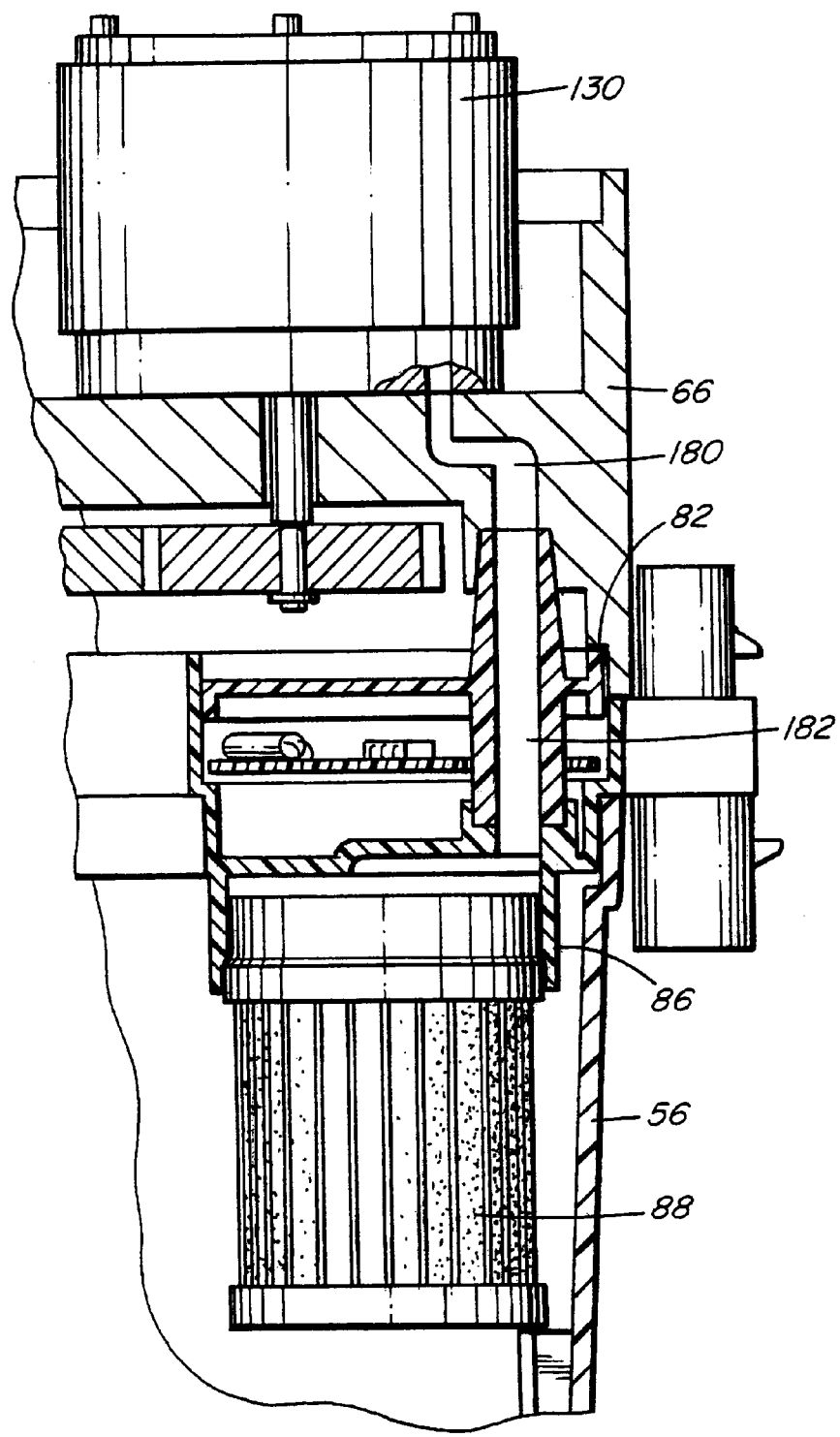
FIG. 15 is a fragmentary sectional view of the burner head assembly showing the air compressor, air filter, air filter mount and air conduits extending between the filter and the compressor.
Figure 16:
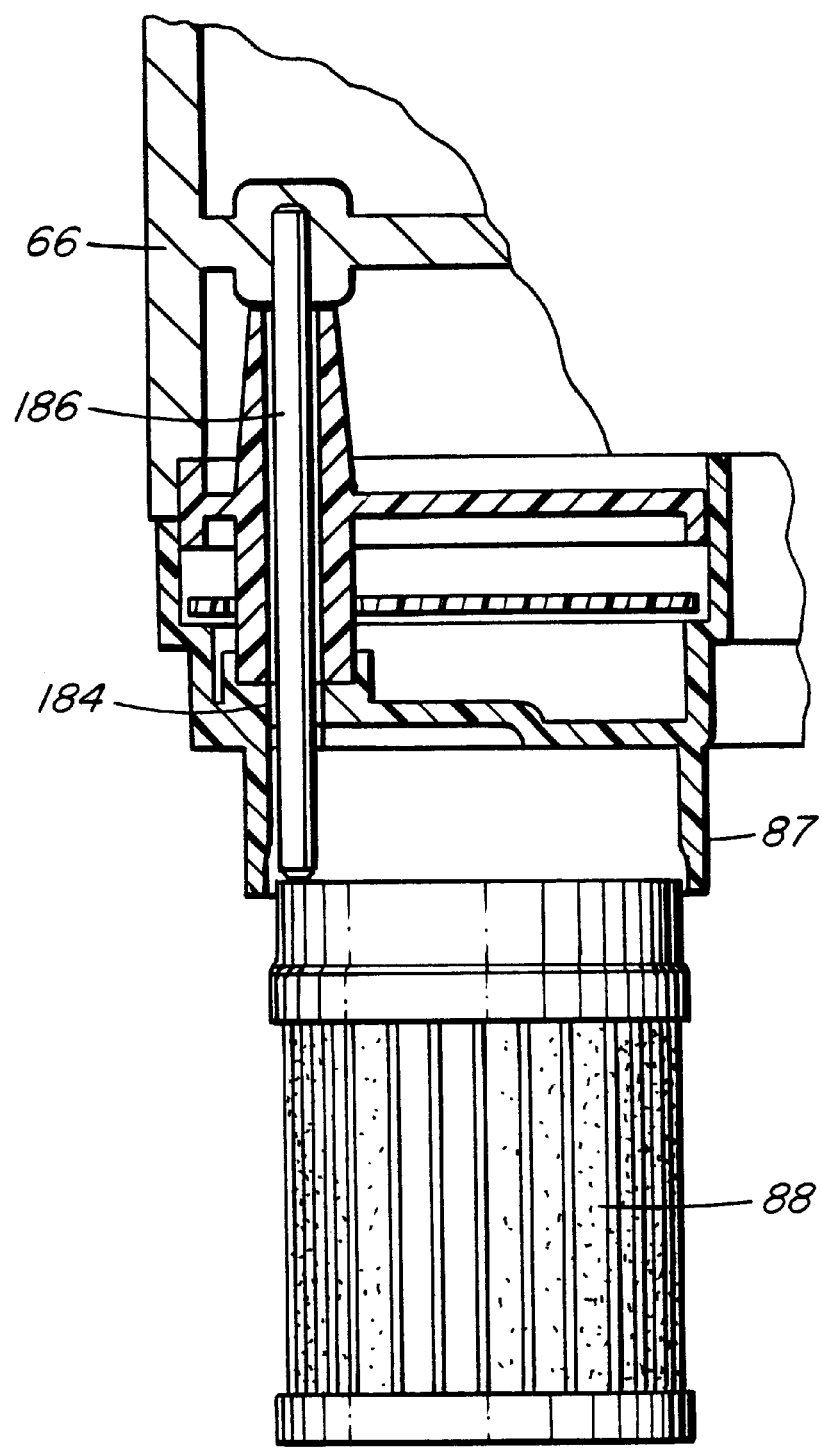
FIG. 16 is a fragmentary sectional view of the housing showing a rod preventing an air filter from fitting an incorrect air filter mount.

As shown in FIG. 15, housing 66 has an air conduit or passageway 180 which communicates with air compressor 130. Likewise control module housing 82 has an air passageway 182 which aligns with air conduit or passageway 180 and communicates with the air filter mount 86 for the position of the control module housing 82 shown in FIG. 3. The passageways 182 and 180 therefore allow air to pass from the air filter to the air compressor. The air filter mount 87 also has an air passageway 184, shown in FIG. 16, which is not used for air in the positions shown in FIG. 3 and FIG. 16. This is because the air compressor is on the opposite side of the assembly. It is desirable to prevent maintenance personnel from inadvertently mounting air filter 88 in the wrong air filter mount, which would be mount 87 in FIGS. 3 and 16. For this purpose a pin 186 is connected to the housing 66 in a position such as to extend through the air passageway 184 as shown in FIG. 16. If an attempt is made to fit air filter 88 into the wrong mount 87, then pin 186 prevents this from happening since the filter contacts the pin and cannot be inserted properly into the mount as shown in FIG. 16.

Figure 13:
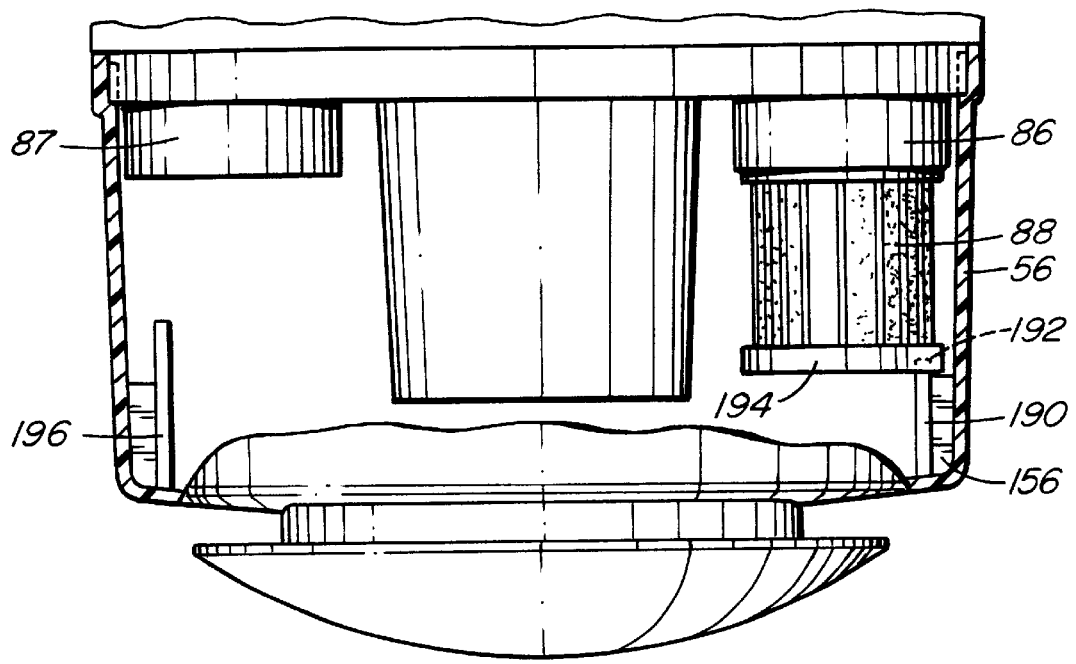
FIG. 13 is a fragmentary plan view of the burner head housing, partly broken away to show two air filter mounts and an air filter correctly mounted on one of the mounts.
Figure 14:
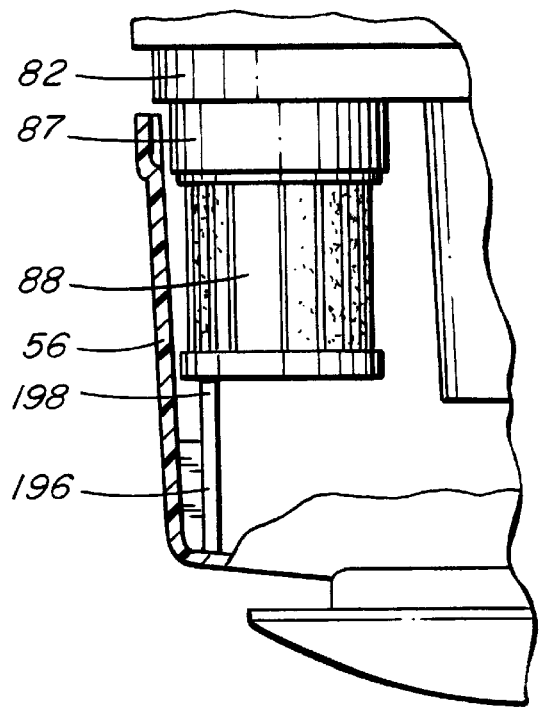
FIG. 14 is a fragmentary view of a portion of FIG. 13 showing an air filter incorrectly mounted on one of the mounts.

FIGS. 13 and 14 illustrate how blower cover 56 holds the air filter properly in position. There is a member or pin 190 inside the blower housing 56 which extends towards the air filter when the air filter is properly positioned as shown. The pin has an outer end 192 which fits within flange 194 of the filter and secures the filter in position. A flange 156 extends between the pin and the rest of the housing apart from the outer end of the pin. The pin 190 is properly dimensioned so that the outer end 192 just contacts the filter when the filter is properly positioned.

There is a similar pin 196 inside the housing on the side opposite pin 190. It may be observed however that pin 196 is longer than pin 190. As shown in FIG. 14, the outer end 198 of pin 196 contacts the filter 88, if the filter is improperly positioned in mount 87, before the housing 56 is properly seated on control module 82. The pin 196 accordingly prevents the blower housing from fitting properly on the control module housing if the filter is improperly positioned.

Figure 19:
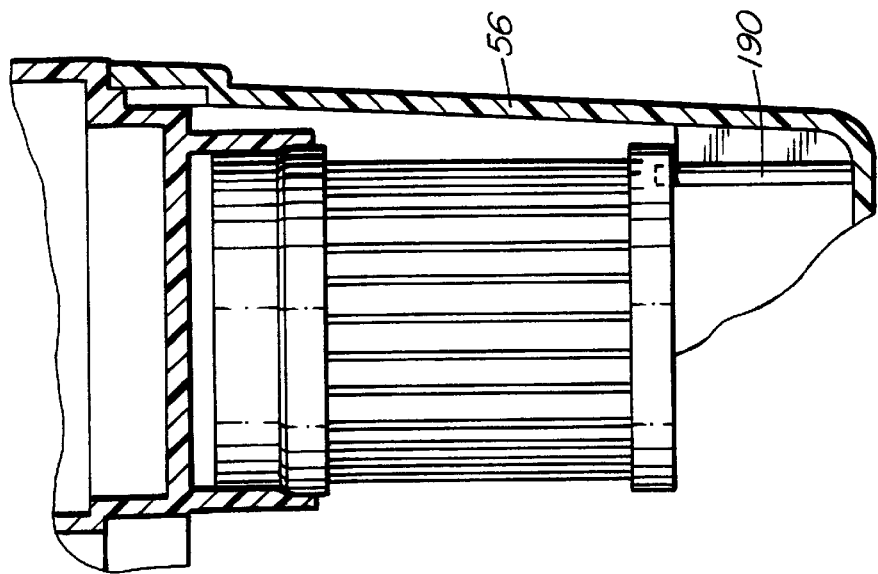
FIG. 19 is a view similar to FIG. 18 showing the portion of the housing fitted onto the control module and against the air filter.
Figure 18:
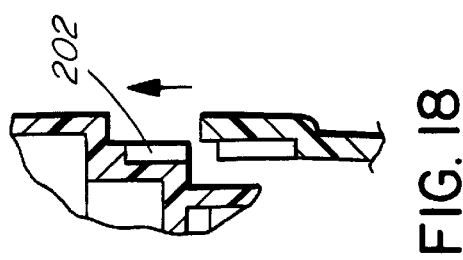
FIG. 18 is a fragmentary view thereof showing the portion of the housing moving towards the control module in a rotationally aligned position.
Figure 17:
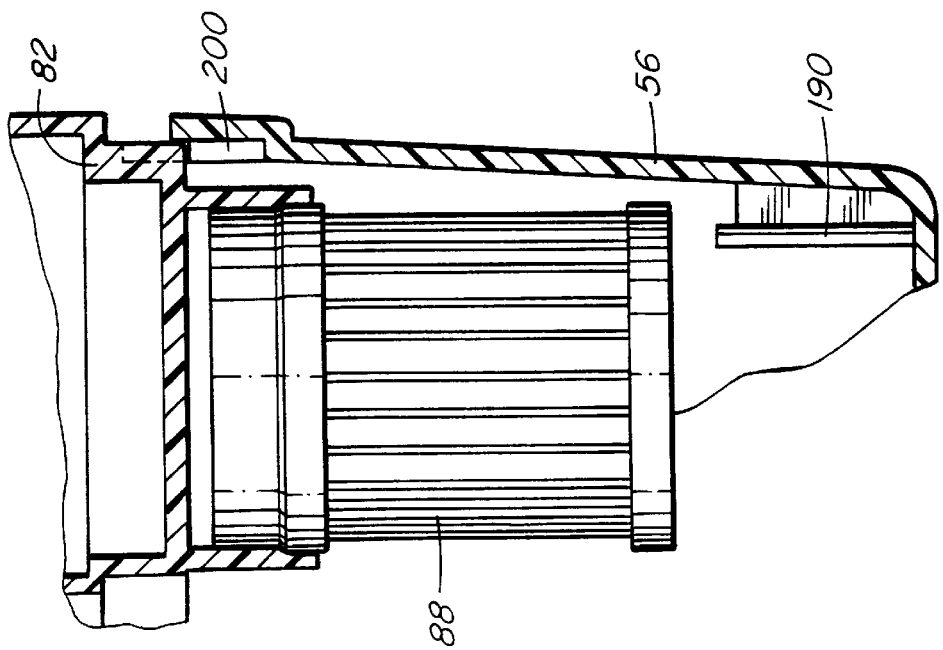
FIG. 17 is a fragmentary sectional view showing a portion of the housing located adjacent to the control module and air filter, in a rotationally nonaligned position.

FIGS. 17–19 illustrate a mechanism for preventing the pin 190 from dislodging the filter when the blower housing 56 is being mounted on the control module housing 82. There is a key 200 on the blower housing 56 and a slot 202 on the module housing 82. There are three more spaced apart similar keys and similar slots on the housings. The keys fit within the slots when the housings 56 and 82 are properly aligned and allow the housings to fit together as shown in FIG. 19. If however the housings are not rotationally aligned, as shown in FIG. 17, then the keys 200 contact housing 82 and prevent the housings from fitting together.

Referring to FIG. 21, the control module housing 82 has an internal circuit board 150. The control module housing as well as the circuit board extend from interior 152 of the burner head assembly to exterior 154 thereof. The circuit board is connected to a pair of external, electrical connectors 156 and 158, thereby allowing external wiring harnesses to be connected to the control module without requiring wiring harnesses to pass through the housing of the burner assembly. Internally the circuit board is connected to such internal electrical connections as auxiliary plug 96 and socket 98.

Figure 4:
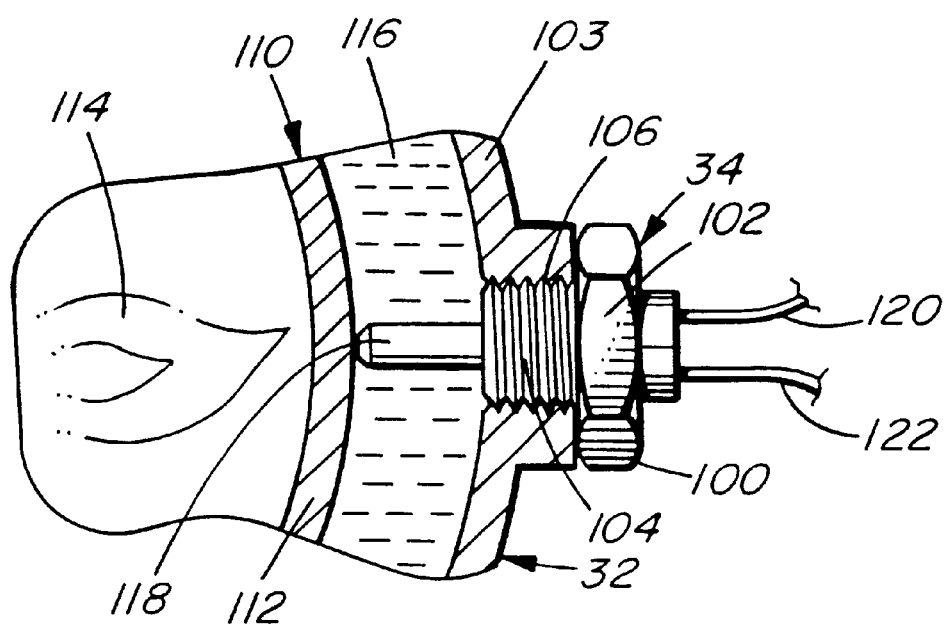
FIG. 4 is a fragmentary, sectional view showing a fragment of the jacket of the heater and a temperature sensor mounted thereon.
Figure 5:
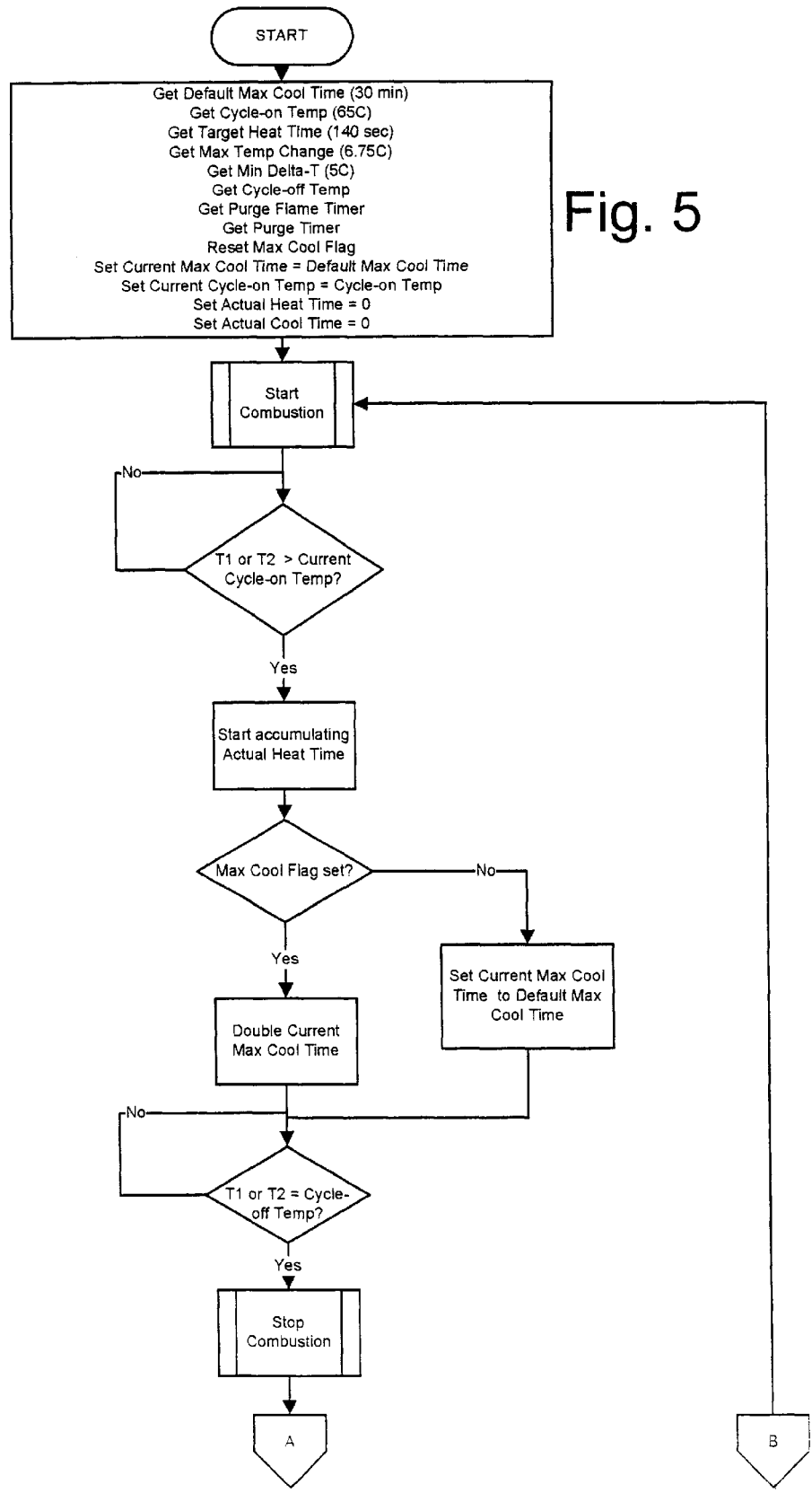
FIG. 5 is a flowchart of the first part of a method according to an embodiment of the invention.
Figure 6:
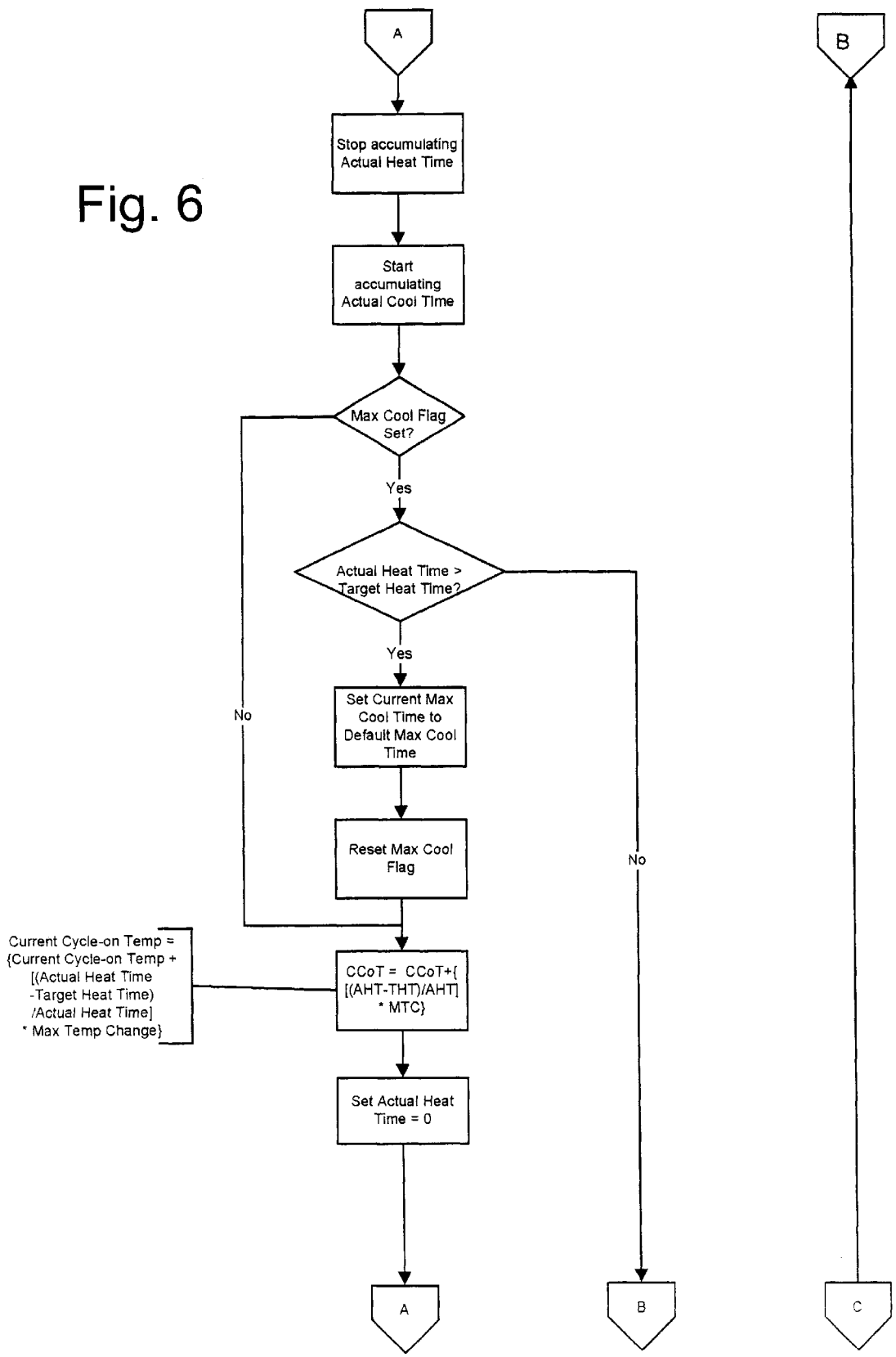
FIG. 6 is a continuation of the flowchart of FIG. 5.
Figure 7:
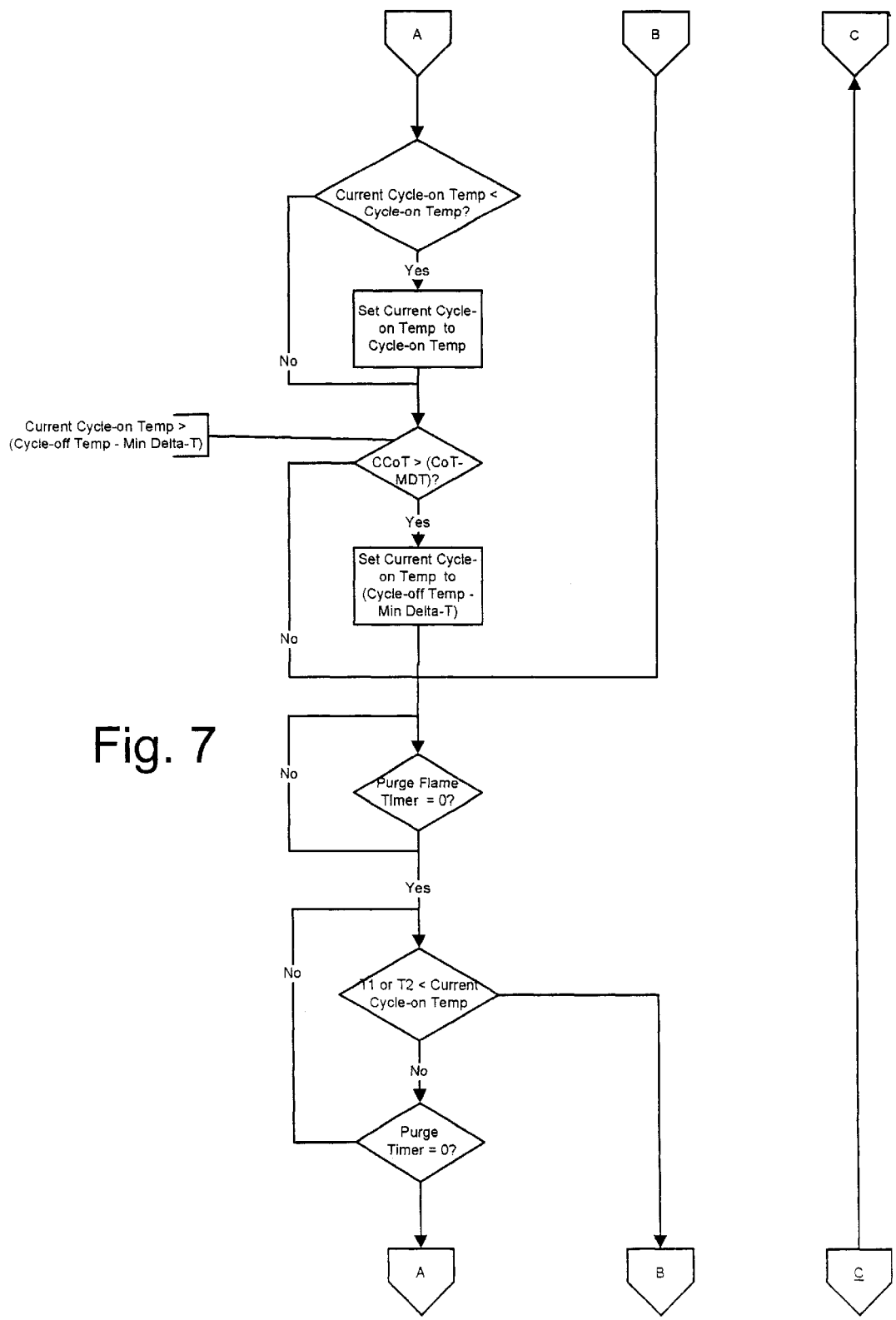
FIG. 7 is a continuation of the flowchart of FIG. 6.
Figure 8:
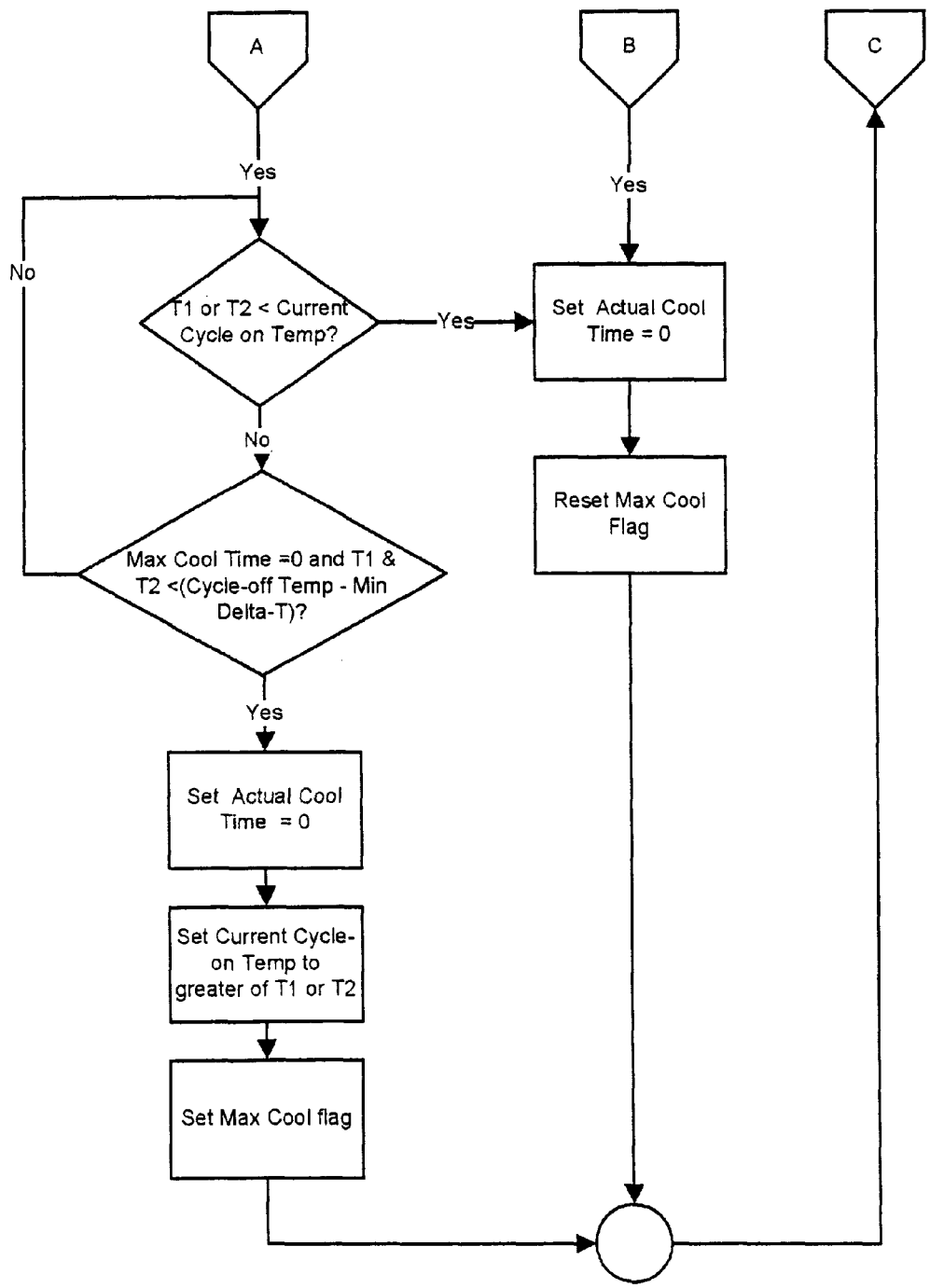
FIG. 8 is a continuation of the flowchart of FIG. 7.

Details of the temperature sensor 34, and a fragment of the heat exchanger are shown in FIG. 4. The sensor includes a body 100 with a hexagonal outer portion 102 and a male threaded, hollow inner portion 104. The male threaded portion is received in a female threaded socket 106 in outer wall 103 of jacket 110 of the heater which surrounds the heat exchanger. The jacket has an inner wall 112 which is exposed to flame 114. Liquid 116, typically water and anti-freeze, is located between the inner wall and the outer wall. The sensor has a spring loaded shank 118 which is biased against the inner wall 112. The sensor has electrical contacts 120 and 122.

Figure 10:
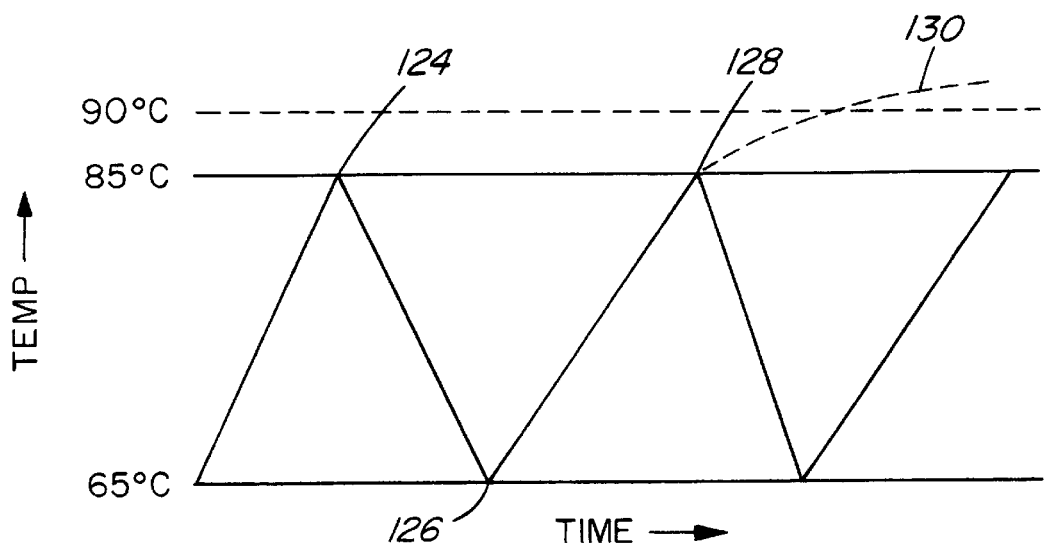
FIG. 10 is a graph showing how temperature is regulated for a conventional heater as well as showing an overheat condition.

In a conventional heater a sensor, such as sensor 34, would function as either a temperature sensor for cycling the heater on and off or as an overheat sensor. With reference to FIG. 10, a normal temperature sensor reads coolant temperatures and turns the burner on when the temperature reaches a lower level, 65° C. in this example. Such a temperature sensor has a portion immersed in the coolant. The burner then operates until the temperature reaches a first value, an upper limit of 85° C. in this example, as illustrated at 124 in FIG. 10. At this point the controls turn the burner off and the temperature gradually falls to a second value, 65° C. again at 126 and the burner is operated again.

However, heaters conventionally also have an overheat sensor which senses, for example, the absence of coolant. If there is no coolant in the jacket, then the inner wall 112 overheats and the heater is shut down. An overheat sensor is therefore in contact with the inner wall of the jacket. Sensor 34, however, serves both functions, to sense temperature of the coolant, as well as sensing overheating of the heater. This is done utilizing the structure of the sensor shown as well as appropriate programming of the control module.

With reference to FIG. 10, the heater is cycled off at points 124 and 128 when the maximum temperature is reached. Under overheat conditions, however, the temperature sensed by the sensor continues to increase after the burner cycles off as indicated at 130 in FIG. 10. Accordingly, the control module senses an overheat condition and shuts down the heater when the sensor 34 indicates a third value, 90° C. in this example, which exceeds the normal maximum temperature, after the heater has been cycled off. Thus a single temperature sensor can fulfill both functions described above.

Figure 11:
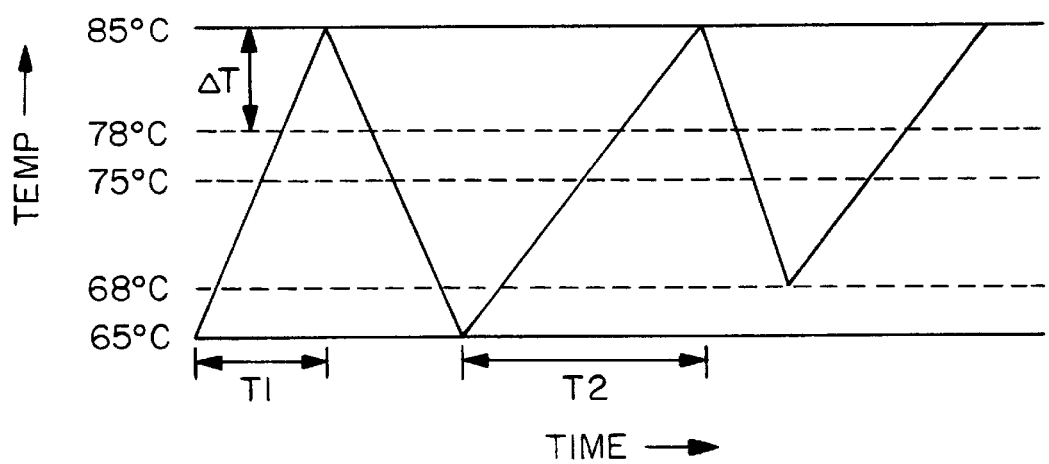
FIG. 11 is a graph showing temperature changes during operation of the heater of FIG. 1.
Figure 12:
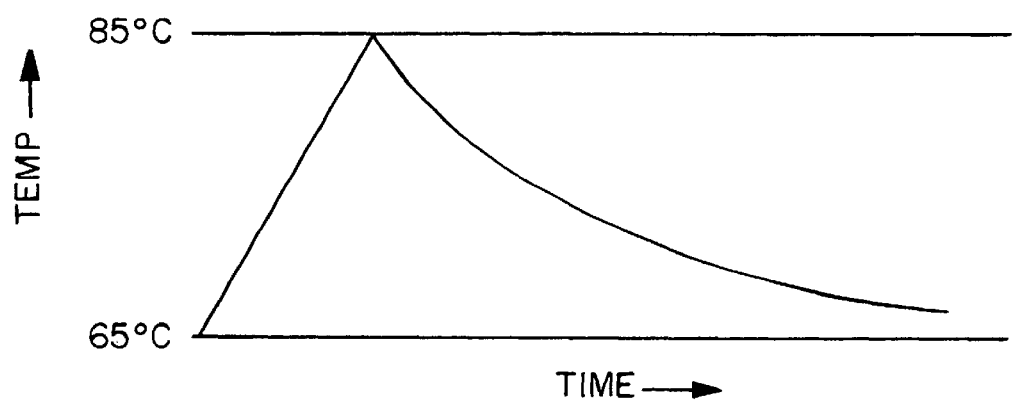
FIG. 12 is a graph similar to FIG. 10 showing operation of the heater during a lingering drop off.

The heater is also adaptable to changing ambient conditions. A normal on/off temperature control, as shown in FIG. 10, may lead to problems when temperatures drop. Referring to FIG. 11, the system may aim at providing a mean temperature of 75° C. by cycling on the heater when the coolant reaches a lower temperature of 65° C. The heater then cycles on until the higher temperature of 85° C. (also referred to as the first temperature value herein) is reached, at which time the heater cycles off. However, at lower ambient temperatures it takes longer for the heater to heat the coolant to the higher temperature. For example, the time increases from T1 to T2 as a result of cooling conditions. The effect of this is to lower the mean temperature below 75° C. This may mean that the temperature inside a bus, for example, may be too cool for the occupants.

The invention overcomes this problem by monitoring the time T1 or T2 which it takes for the heater to heat the coolant to the higher temperature. When this time increases, the control module increases the temperature where the heater cycles on (also referred to as the second temperature value herein). For example, in FIG. 1 the cycle-on temperature is increased to 68° C. since the controls determined that T2 exceeds T1. The cycle-on temperature is also lowered if the time interval to heat the coolant shortens. The cycle-on temperature is varied in this example between specific limits, the lower limit being 65° C. and the upper limit being 78° C. which is a fixed amount, ΔT, below the maximum temperature. The programming of the controls is set out in detail in FIGS. 5–8.

The algorithm can only modify the temperature within the standard range of 65° C. to 85° C. The cycle-off temperature is never adjusted. This ensures that in the worst-case scenario the heater would just revert back to the standard control method. The algorithm updates the cycle-on temperature once every cooling curve. This ensures that the heater will rapidly adapt to any changes in the parameters of the heating system. By using the heat time to calculate the new cycle-on temperature, every parameter of the heating system is taken into consideration.

Details of the algorithm follow:

Adjusting Cycle-on Temperature a) The current cycle-on temperature threshold is adjusted at the end of each heating interval (i.e. on entry to purge state)
   i) based on the formula:

New-current cycle-on temperature threshold=(1−(target heat time/ actual heat time))* maximum temperature change+current cycle-on temperature threshold (1) target heat time defines the ideal flame-on-time
   (2) actual heat time is measured as duration of heating cycle starting with entry into ignition state and ending with cycle-off event, but qualified by at least one temperature sensor reading above current cycle-on temperature threshold
   (3) maximum temperature changes intended to limit the amount of adjustment made in one heating cycle
   ii) current cycle-on temperature threshold is not permitted to exceed (cycle-off temperature threshold-minimum delta-T), or be less than cycle-on temperature threshold.

Timed Cycle-On a) a cycle-on event is forced if cooling time since the end of the previous heating cycle exceeds the current maximum cool time and at least one temperature sensor is reading less than cycle-off temperature threshold-minimum delta-T
   i) a current maximum cool time timeout can occur in standby or standby supplemental states
   ii) a current maximum cool time timeout causes the current cycle-on temperature threshold to be updated with the greater of the two temperature sensor readings.
b) for each consecutive heating cycle begun due to current maximum cool time, the value of current maximum cool time is doubled (for use in the next cycle)
   i) in the subsequent heating cycle, the value of current cycle-on temperature threshold is adjusted per the formula above, as usual.
   ii) if, in the current heating cycle, actual heat time exceeds target heat time, then current maximum cool time reverts to default maximum cool time.

Short Cycle a) While purge or purge error state, if T1 and T2<current cycle-on temperature threshold, the system does not wait for completion of purge state, but immediately cycles-on the heater, i.e. abandons purge state, and skips standby state. If the heater is operating in supplemental mode, it also skips the pre-run state.

Initial Conditions a) at power-up, the value of current cycle-on temperature threshold reverts to the value of cycle-on temperature threshold, and the value of current maximum cool time reverts to the value of default maximum cool time. Also, the cooling time timer is reset.
b) At switch-off, the value of current maximum cool time reverts to the value of default maximum cool time. Also the cooling time timer is reset.

As described above, the heater can operate with a single temperature sensor 34 as shown in FIG. 1. Optionally however a second sensor 36 may be used for some applications. Typically one sensor is adjacent the hot end of the heater, sensor 34 in this example, and another sensor is adjacent the cool end of the heater, sensor 36 in this example. As described above, both sensors are coolant temperature sensors, but sensor 34 in addition acts as an overheat sensor. It is desirable to have the system adapt so that the flow of coolant through the heater can travel from either fitting 40 to fitting 42 or from fitting 42 to fitting 40. The choice depends upon the plumbing requirements of a particular installation, for example. In such a system with two sensors is also desirable to have the system operate even if one sensor is removed or if one sensor becomes dysfunctional.

Figure 9:
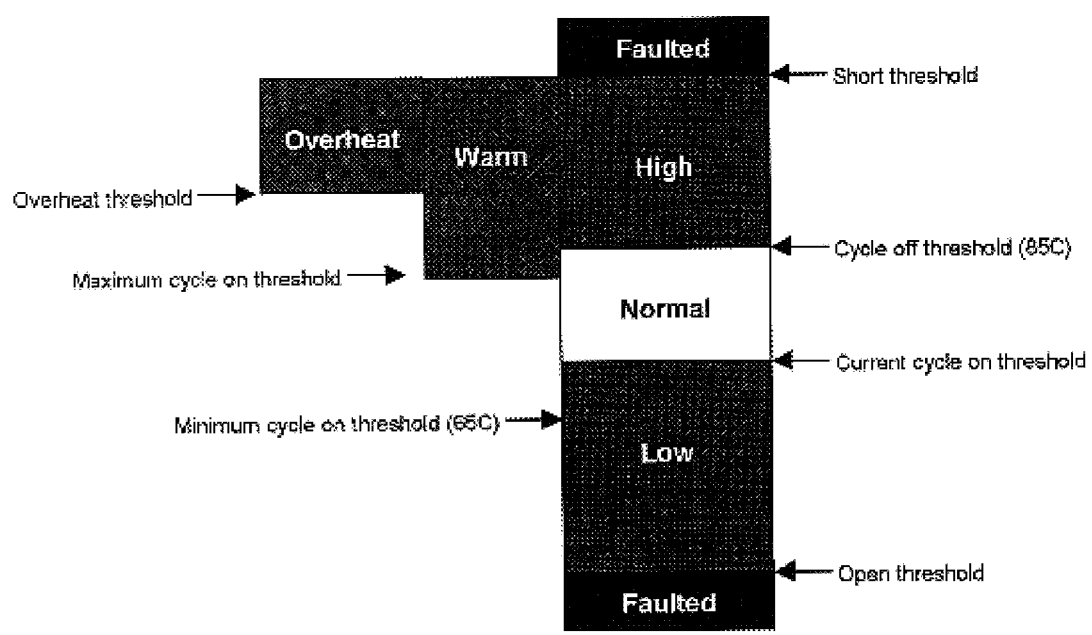
FIG. 9 is a chart showing temperature conditions and temperature designations for the heater of FIG. 1.

FIG. 9 is a chart which sets out various temperature designations and ranges of temperatures employed by the invention. The heater normally cycles within the Normal range of temperatures between the Current Cycle On Threshold and the Cycle Off Threshold. The Cycle Off Threshold is a fixed first value, 85° C. for the example of FIG. 11. On the other hand, the Current Cycle On Threshold, or cycle-on temperature, varies between a second value, the Minimum Cycle On Threshold, 65° C. in the case of FIG. 11, to the Maximum Cycle On Threshold, namely 78° C. in the case of FIG. 11. There is also a third value, an Overheat Threshold which is, for example 90° C. in FIG. 10, which, when sensed, results in shutting the heater down. In addition there is the Open Threshold. When the control module receives a voltage reading from a sensor equivalent to a temperature lower than the Open Threshold, then this indicates an open circuit and that the sensor has faulted. Likewise there is a Short Threshold which, when exceeded, indicates that the sensor has shorted.

A temperature within the range between the Current Cycle On Threshold and the Cycle Off Threshold is considered to be within the Normal range. Temperatures below the Current Cycle On Threshold and the Open Threshold are considered in the Low temperature range. Temperatures below the Open Threshold indicate a Faulted condition.

Temperatures above the Maximum Cycle On Threshold and below the Short Threshold are considered within the Warm range. However temperatures above the Cycle Off Threshold and below the Short Threshold are considered in the High range. Temperatures above the Overheat Threshold, but below the Short Threshold are in the Overheat range. Finally temperatures above the Short Threshold show a Faulted condition.

The heater may be configured to expect one or two temperature sensors. The temperature sensor may be connected to either sensor connection on the control module. When the system is configured to expect two temperature sensors, the coolant flow through the heat exchanger may be non-specific. This object is achieved by combining the values of the two sensors into a single overall status according to the following table:

TABLE 1

| Temp Sensor 2 | Temperature Sensor 1 | | | | | |
|---|---|---|---|---|---|---|
|   | F | OH | H | W | N | L |
| F | F | F | F | F | F | F |
| OH | F | OH | OH | OH | OH | OH |
| H | F | OH | H | H | H | H |
| W | F | OH | H | W | W | W |
| N | F | OH | H | W | N | N |
| L | F | OH | H | W | N | L |

In the above table the temperature ranges in the upper row are those sensed by sensor 1. The temperature ranges in the left-hand column are those sensed by sensor 2. F indicates a temperature in the Faulted range, OH a temperature in the Overheat range, H a temperature in the High range, W a temperature in the Warm range, N a temperature in the Normal range and L a temperature in the Low range.

Alternatively there may be conditions when only one sensor is required, but actually two are present. In this case the control module does not attempt to determine which one is present. The table below defines the overall condition assuming that the absent sensor appears Faulted/open. When there is only one sensor present or required, and if it is faulted, then the control module does not know which sensor is faulted, so faults on both sensors are generated even though there is only one.

TABLE 2

| Temp Sensor 2 | Temperature Sensor 1 | | | | | |
|---|---|---|---|---|---|---|
|  | F | OH | H | W | N | L |
| F | F | OH | H | W | N | L |
| OH | OH | OH | OH | OH | OH | OH |
| H | H | OH | H | H | H | H |
| W | W | OH | H | W | W | W |
| N | N | OH | H | W | N | N |
| L | L | OH | H | W | N | L |

For prior art utilizing an NTC thermistor, it is possible the small amount of moisture or corrosion across the sensor leads can simulate a cold temperature reading. This may cause the heater to fire with a false low reading, and may allow the heater to operate indefinitely if the reading does not change.

An algorithm is used to detect a temperature sensor that is not considered open or shorted, but stuck at some level. It is considered a Delta-T fault if at least one temperature level does not increase by a minimum Delta-T (3° C. in this example) from the time the heater enters the Ignition state until it has been in the Run/Reignition states for a Delta-T check time (60 seconds in this example). If either temperature increases by the minimum Delta-T or more, then there is no Delta-T fault. Otherwise a Delta-T fault is indicated for each sensor (which is not faulted open/short) whose value was less than a maximum initial temperture (25° C. in this example) at cycle-on time.

A further application of this algorithm is to operate it at all times that the burner is firing, and evaluate the temperature reading against typically anticipated values.

While the controls and methods described above are particularly adapted for transit vehicle heaters and other vehicle heaters, they may also be useful, with some alterations, for use with other heaters or other heat transfer devices such as furnaces or air conditioners. Air conditioners typically cycle on and off between fixed higher, cycle-on temperatures and fixed, cycle-off temperatures. The invention can be utilized for example to vary the cycle-on temperature to maintain a desirable average temperature.

Figure 22:
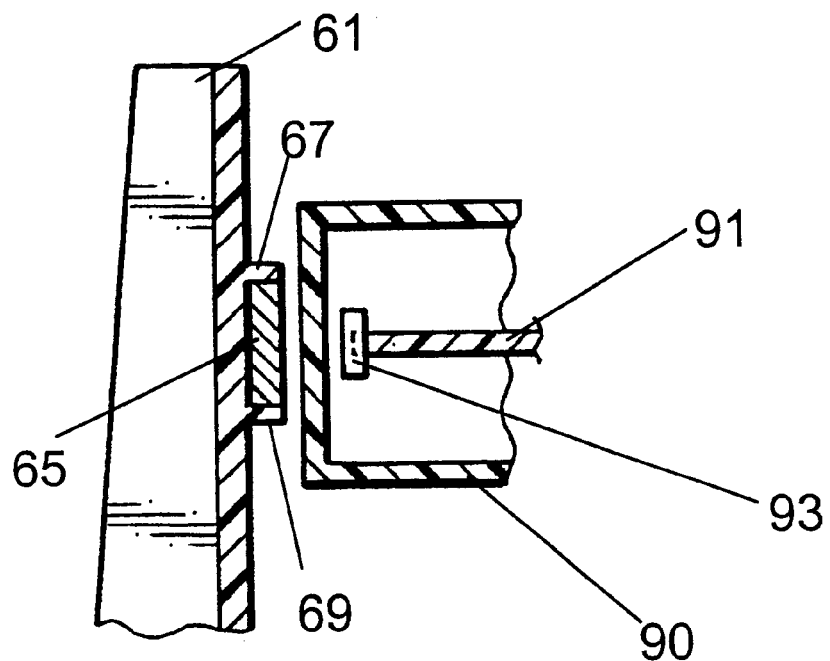
FIG. 22 is a fragmentary sectional view showing the Hall effect sensor and magnet on the fan blade assembly for the heater of FIG. 1.

Referring back to FIG. 3, the blower 60 includes a fan blade assembly 61 which is disc-shaped and has a plurality of blades 63. As shown in FIG. 22, there is a magnet 65 mounted on the assembly 61 between a pair of projections 67 and 69. CPU board housing 90, shown in FIG. 3 and FIG. 22, houses circuit board 91 which has a Hall effect sensor 93 on the end thereof which faces the fan blade assembly. The Hall effect sensor is aligned with the magnet so that the magnet passes the Hall effect sensor on each rotation of the fan blade assembly and, accordingly, on each rotation of the motor 64. The Hall effect sensor therefore acts as a speed sensor which is responsive to rotational speeds of the fan.

Figure 23:
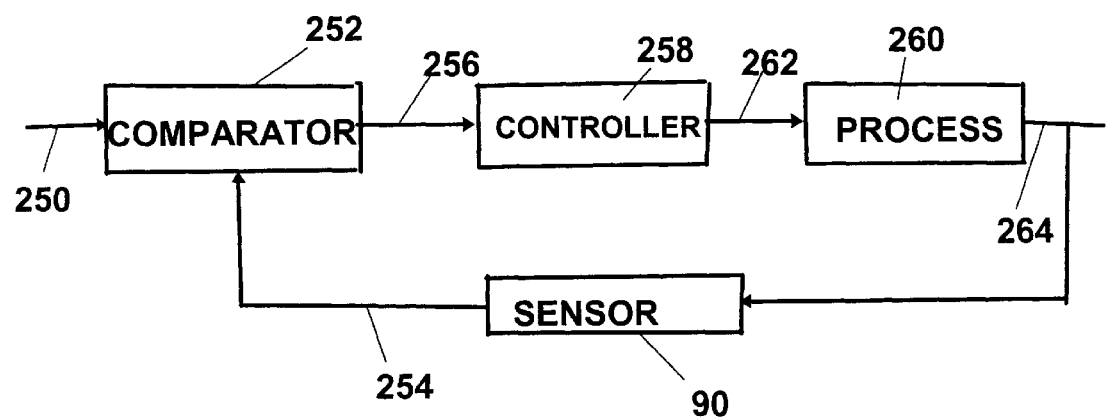
FIG. 23 is a diagram showing the closed loop control system for the motor thereof.
Figure 24:
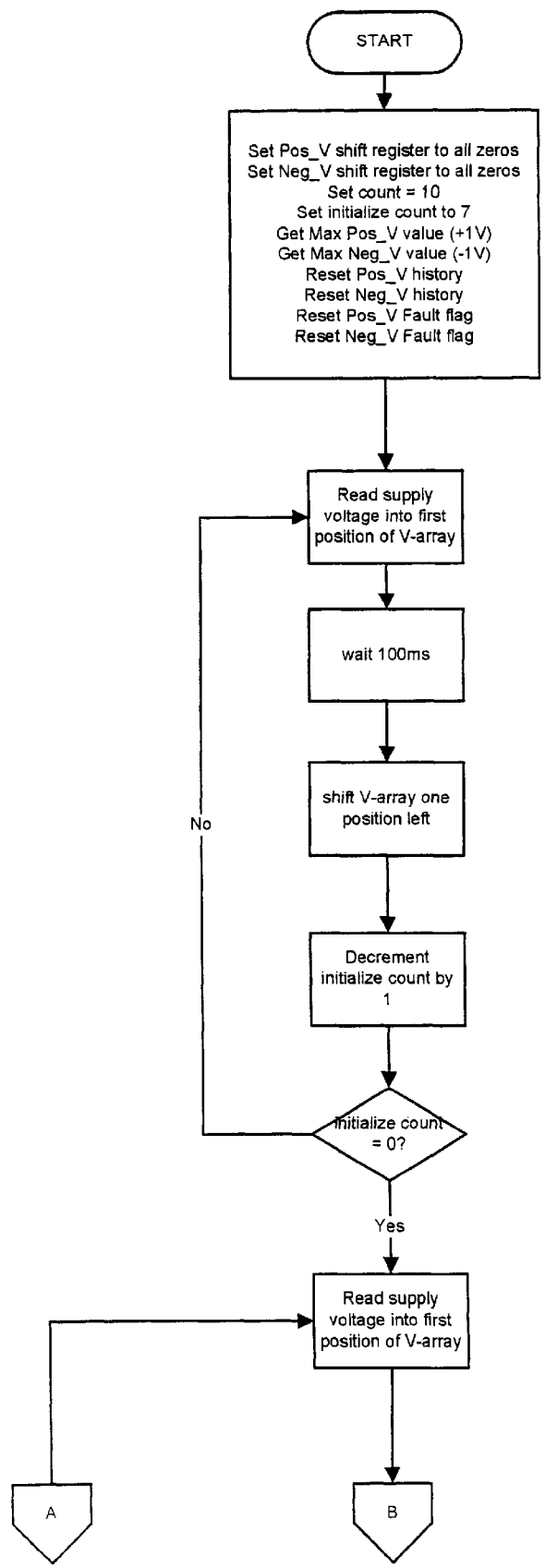
FIGS. 24–27 together comprise a flowchart of the system for distinguishing overcurrent faults from voltage changes occurring when the engine of the vehicle starts.
Figure 25:
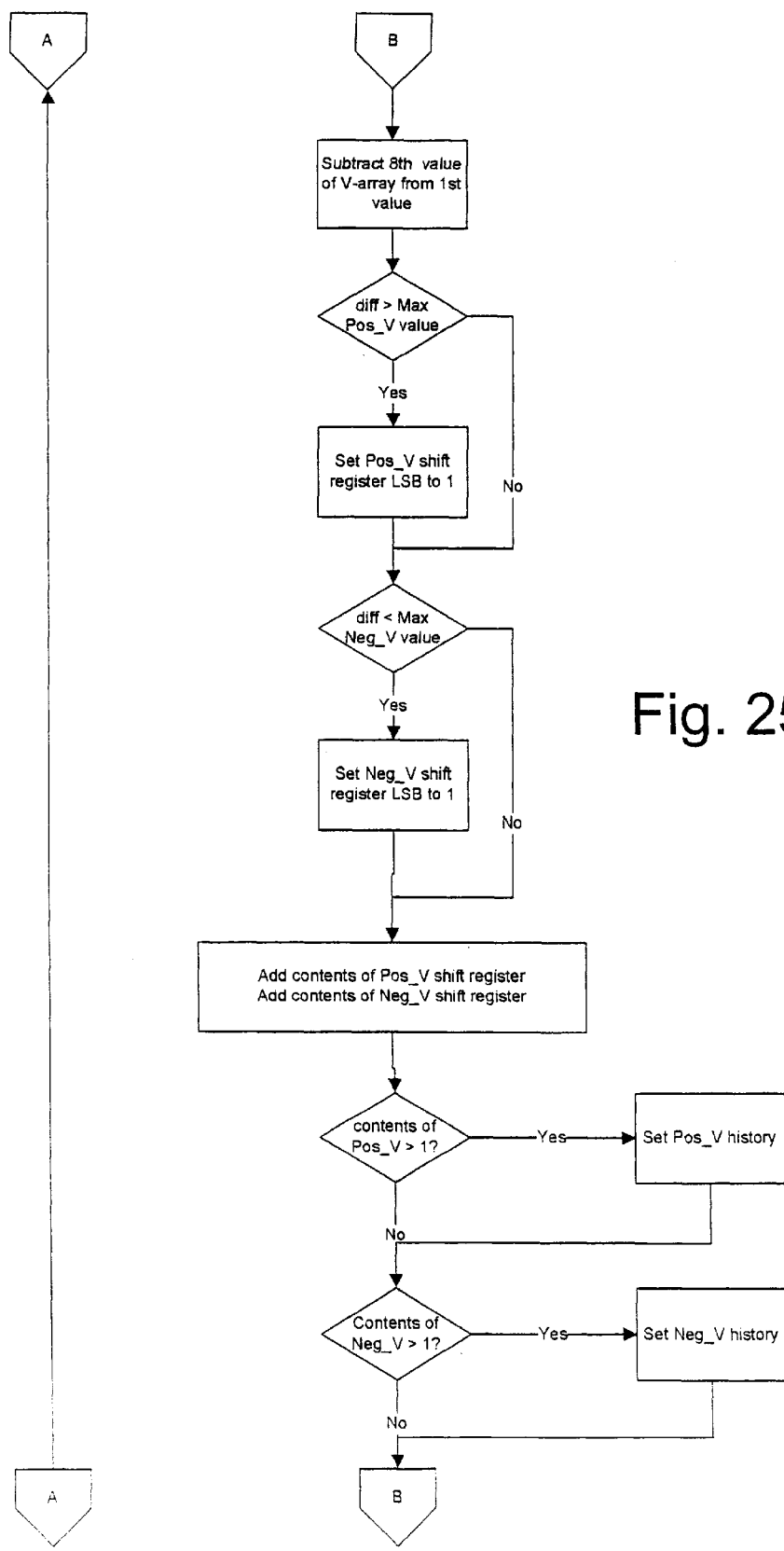
Figure 26:
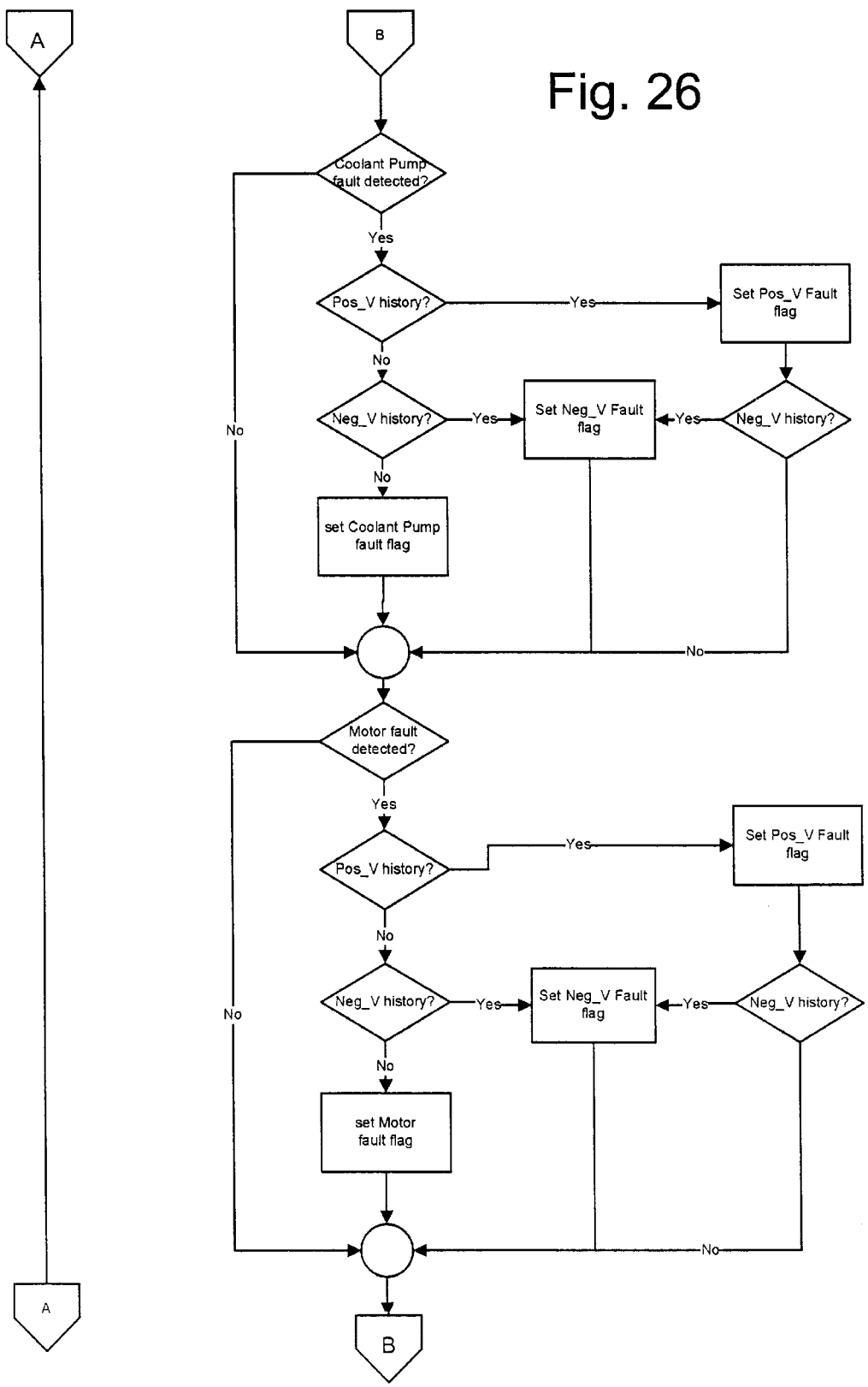
Figure 27:
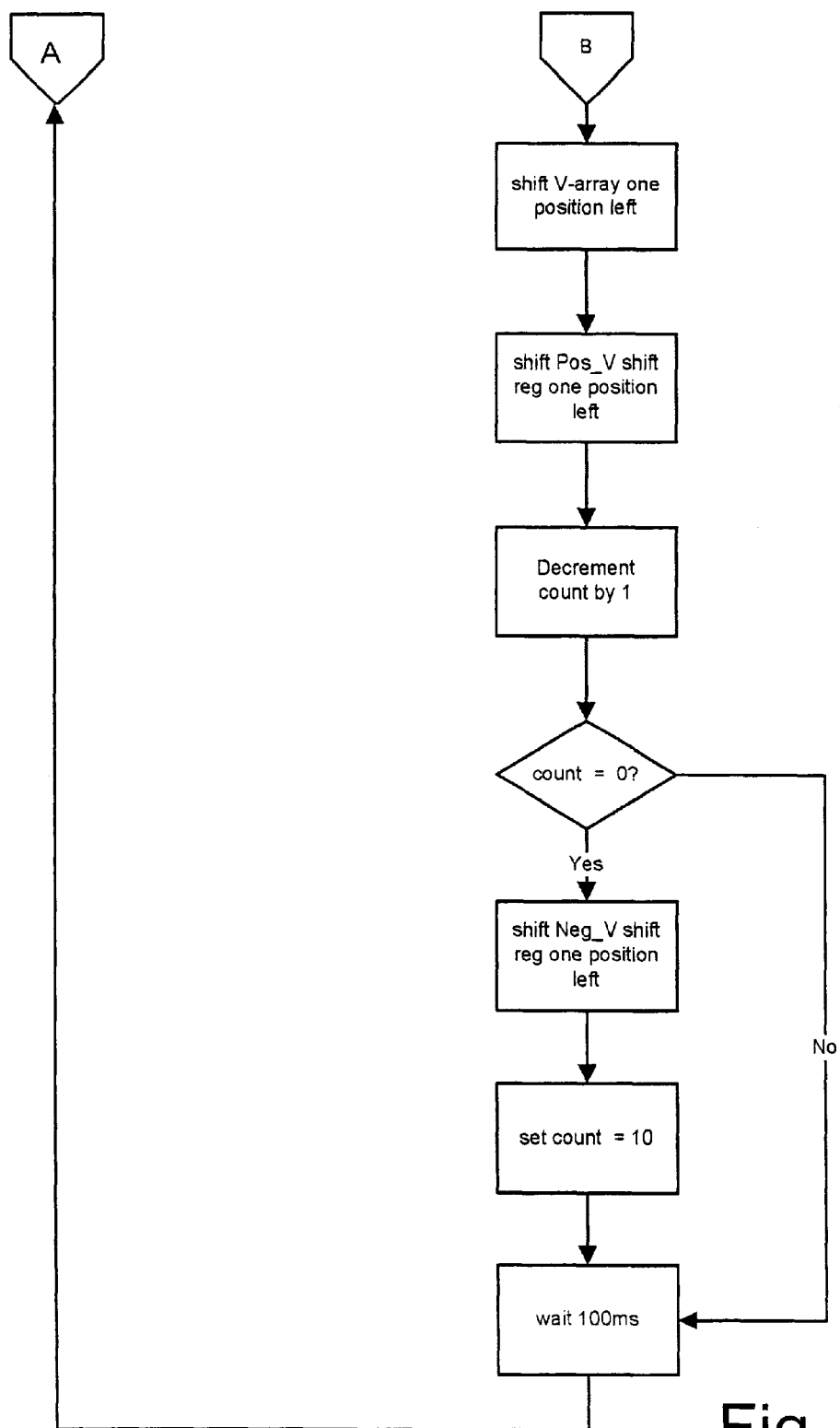

A programmable control module mounted on the circuit board 91 is operatively connected to the Hall effect sensor and includes a closed loop feedback control for the motor as shown in FIG. 23. A desired motor speed is inputted at 250 and the processor compares this value at 252 to the momentarily measured value 254 as sensed by the sensor. The calculated error 256 is inputted into control module 258 which drives process 260 with the value 262 to change its output 264.

The use of speed control provides significant advantages over earlier vehicle heaters where speed control has not been used. Accordingly, motor speed varied as much as 50 percent depending upon the voltage supplied to the heater. The addition of speed control means that the speed of the motor is independent of voltage and the output of the heater can be regulated by selecting a particular motor speed which will give the heater the required amount of fuel and air for the designated output. Furthermore, the heater can be a single speed heater or a variable speed heater which accordingly can change the output. For example, the output could be increased initially to heat up a vehicle and then decreased to maintain a steady temperature.

The heater 30 has a backup speed control system in case of failure of the system described above including, for example, failure of the Hall effect sensor or physical dislocation of the magnet. The control module includes a lookup table. It looks up the voltage supplied to the heater in the lookup table and uses pulse width modulation to yield the desired rotational speed for the motor. For example, Table 3 below shows that for desired rotational speed of 3600 rpm, the required PWM at a supply voltage of 12 volts is 85 percent.

TABLE 3

| Volts | PWM |
|---|---|
| 9 | 100 |
| 10 | 95 |
| 11 | 90 |
| 12 | 85 |
| 13 | 83 |
| 14 | 80 |
| 15 | 78 |
| 16 | 76 |
| 17 | 74 |
| 18 | 72 |
| 18 | 70 |
| 19 | 68 |
| 20 | 66 |
| 21 | 64 |
| 22 | 62 |
| 23 | 61 |
| 24 | 60 |
| 25 | 59 |
| 26 | 58 |
| 27 | 57 |
| 28 | 56 |
| 29 | 55 |
| 30 | 54 |

Pulse width modulation is used to reduce the speed to the required amount even if the voltage is higher. During operation of the Hall effect sensor, the table is constantly updated to indicate the amount of pulse width modulation required to yield the correct rotational speed for a particular voltage applied to the heater. If the Hall effect sensor fails, then speed control is maintained utilizing this table. Effectively the control module strips off voltages above 9 volts in the above example.

The use of the speed control system utilizing pulse width modulation allows the heater to be used for electrical systems having different voltages. In this example the heater 30 runs at 9 V, but can be utilized on 12 V or 24 V systems. The speed controller strips off the voltages above 9 V as mentioned above. Also the output of the heater can be increased or decreased by increasing or decreasing rotational speed of the motor. A few other modifications are necessary including changing the nozzle 134. Different motors are not required for different heater outputs, but rather a single motor can be used for different heating capacities unlike the prior art. This reduces the number of components which must be ordered and stored. A personal computer utilizing appropriate software can be connected to a port on the heater and used to change the speed of the motor has desired.

Before the control module commences the combustion process, it exercises selective heater components to allow a service technician to directly observe and verify operation of these loads. This facilitates troubleshooting and eliminates the requirement for special test tools.

In the heater 30, the status of the flame sensor 149, shown in FIG. 20, is mirrored by an indicator light 161 shown in FIG. 2. This removes the need for a sight glass to allow an operator or technician to view the combustion area for the presence or absence of the flame. As described above, the flame sensor is integrated into the control module. The operation of the flame sensor should be independently verified so that the entire control module is not replaced for what might be a combustion related problem. With the heater switched off, but with power supplied to the heater, the burner head is removed from the heater assembly and a flashlight is directed onto the flame sensor. If the indicator light turns on, then the flame sensor functionality is confirmed. This can eliminate the flame sensor as a potential problem when troubleshooting.

Figure 31:
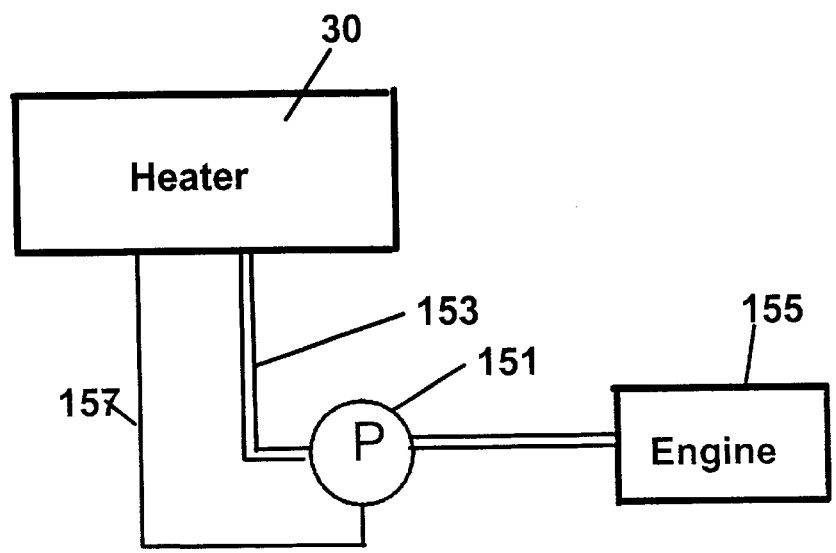
FIG. 31 is a diagrammatic representation of the heater and coolant pump of the vehicle.

FIG. 31 shows a coolant pump 151 which is connected to heater 30 by coolant conduit 153 and to the cooling system of engine 155. A cable 157 connects the pump to the heater and supplies the pump with power when operation of the pump is required.

Figure 28:
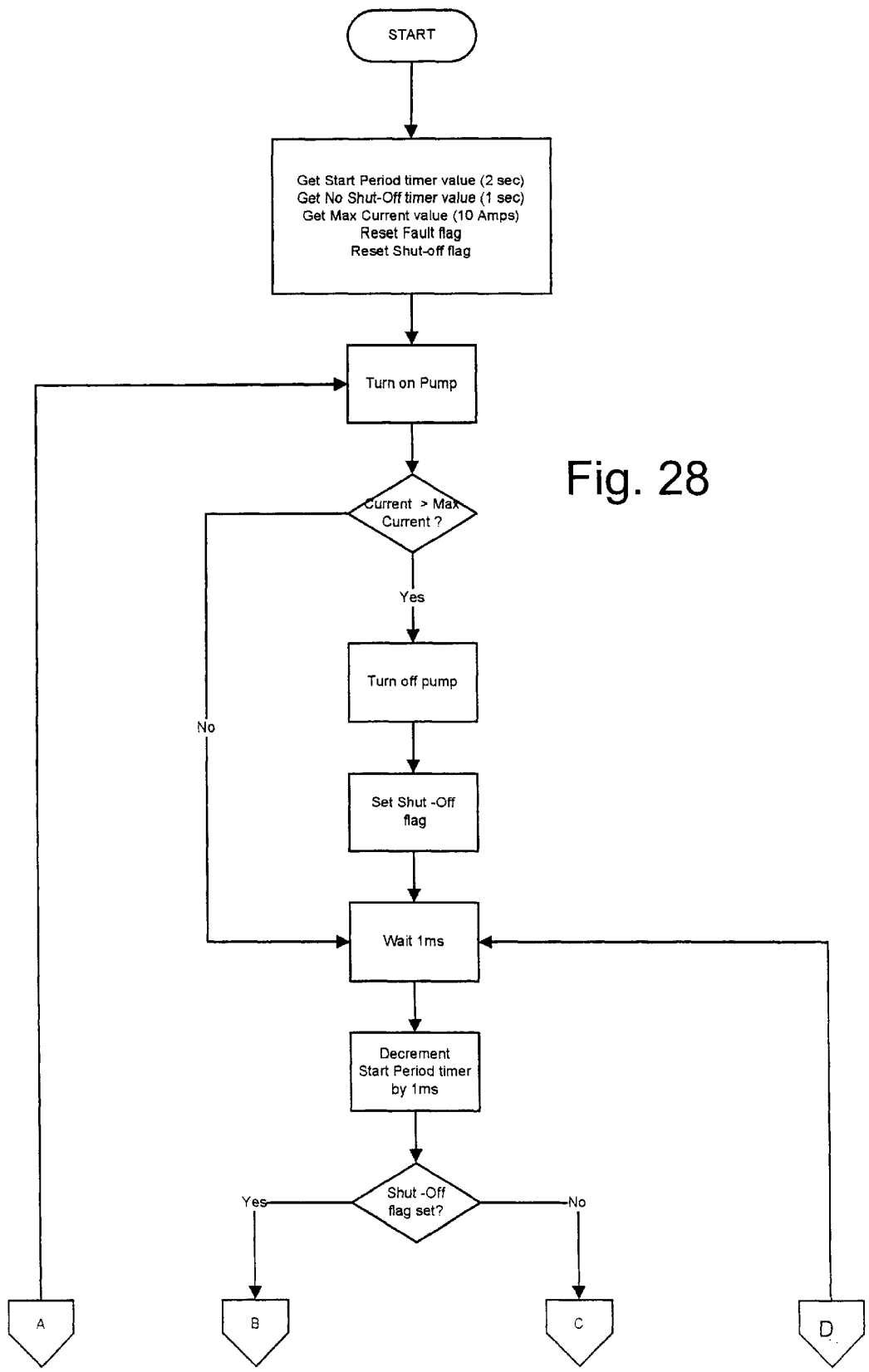
FIGS. 28 and 29 together comprise a flowchart of the system for selectively soft starting the coolant pump.

The coolant pump may have a current limit which is less than the inrush current encountered when the coolant pump motor is started. For example, the current limit for the motor may be 10 amps, but the inrush current may be 20 amps. A soft start may be employed so as to reduce the current supplied to the motor when the motor starts. In the case where a large pump is utilized, it must be indirectly driven through the use of a relay. However, soft starts may cause chatter in the relay. This causes the relay to eventually fail. Accordingly, the software for the control module uses a special procedure to turn on the coolant pump output. This is shown in detail in the flowchart of FIGS. 28–29.

The software initially turns on the coolant pump output. If the load current exceeds a preset maximum, the hardware turns off the output and asserts its shut-off line. One millisecond after turning on the output, the software checks the shut-off line. If the coolant pump is still shutting off after two seconds, then the Control module declares a coolant pump fault. At any of the shut-off checks on one millisecond intervals, if the shut-off line is not asserted, then the Control module sets up a one second timer. If there are no further shut-offs by the time that the timer expires, then the Control module declares the pump successfully started and any subsequent shut-offs are declared coolant pump faults. However if a shut-off does occur before the one second timer expires, then the Control module resumes its one millisecond check sequence (it is still within two seconds of the start of the software procedure). This procedure essentially results in a 1 kHz variable duty cycle pulse width modulation (PWM) that lasts no longer than two seconds, with successful starts known to have been running for at least one second without faltering.

Using this approach large loads with an inrush current exceeding the preset maximum will be soft-started, thus protecting the control module from low-voltage transients, and protecting the load from demagnetization (only if it is a motor). Loads with inrush currents below the preset maximum will be hard-started. When using a relay to drive a large coolant pump, this prevents relay chatter and prolongs relay life.

Essentially this means that a soft start is selectively used if the current is above a certain level and hard start is used if the current is below this level to extend relay life. The soft start turns on and off rapidly like a pulse width modulation.

During starting of the vehicle engine, the voltage supply to the heater drops as the engine is cranked by the starter motor. The voltage then jumps when the alternator becomes operational. This voltage jump may show a false high current fault and consequently problems for the operator. The invention addresses this problem by looking for rapid voltage changes when an overcurrent condition occurs.

Figure 29:
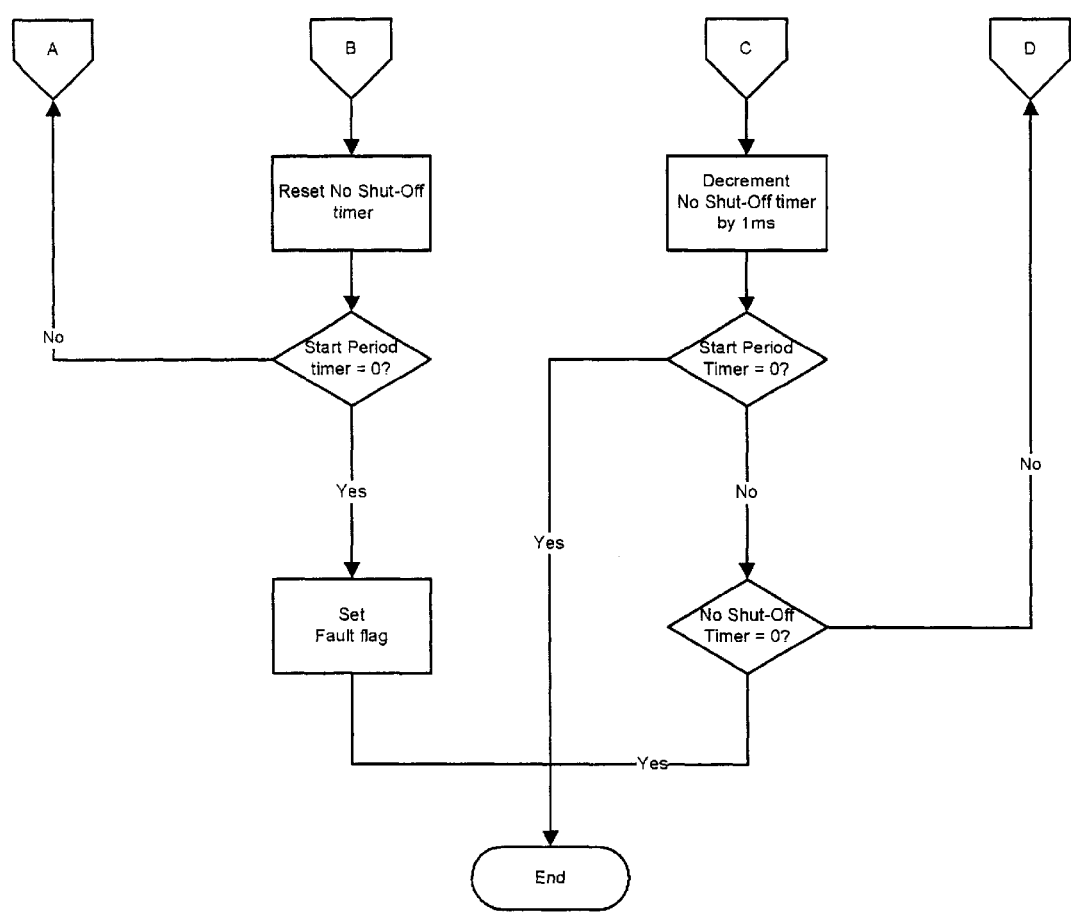
Figure 30:
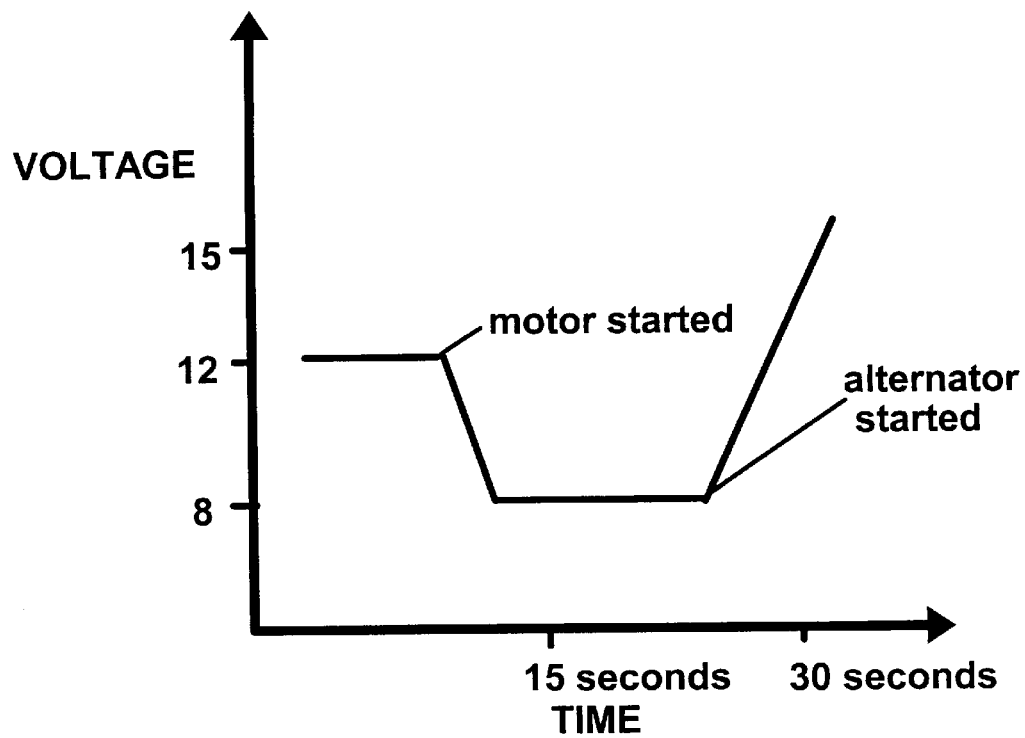
FIG. 30 is a graph representing voltage changes when the engine starts.

The shown in FIG. 29 when the vehicle is started and the Control module is operating, the Control module sees a drop in supply voltage during engine cranking, perhaps for several seconds. The motor speed control will probably increase the motor duty cycle to compensate. This drop in supply voltage is followed by a sudden increase in supply voltage when the alternator becomes operational. Such a rapid increase in supply voltage could result in motor and/or coolant pump overcurrent faults.

The means of overcoming this problem is shown in the flowchart of FIGS. 24–27. The Control module continuously keeps track of whether there has been a large change in supply voltage. Supply voltage level was measured 10 times per second with the last 8 samples retained. As each new sample is obtained, the Control module compares it with the sample taken 0.7 seconds ago. If the voltage rose by more than 1 volt, a 1 bit is shifted into a 32-bit shift register, allowing up to 3.2 seconds of history. Otherwise, once per 0.1 seconds, a zero is shifted in. If the voltage fell by more than 1 volt, a 1 bit is shifted into a separate 32-bit shift register, allowing up to 32 seconds of history. Once per second a zero is shifted in.

When a coolant pump or motor (peak or average) overcurrent fault occurs, the Control module checks to see if any rise events occurred in the last 2 seconds, or any fall events occurred in the last 30 seconds. If so, then the apparent coolant pump or motor current fault is declared a dV fault and essentially ignored. The fault is logged using a new code indicating rising and/or falling supply voltage. The Finite State Machine logic which runs the control module proceeds to a Purge Error state. The Error Count does not increment and the indicator light does not blink. It will be readily understood that the values given above are by way of example and would be altered in different embodiments.

Figure 32:
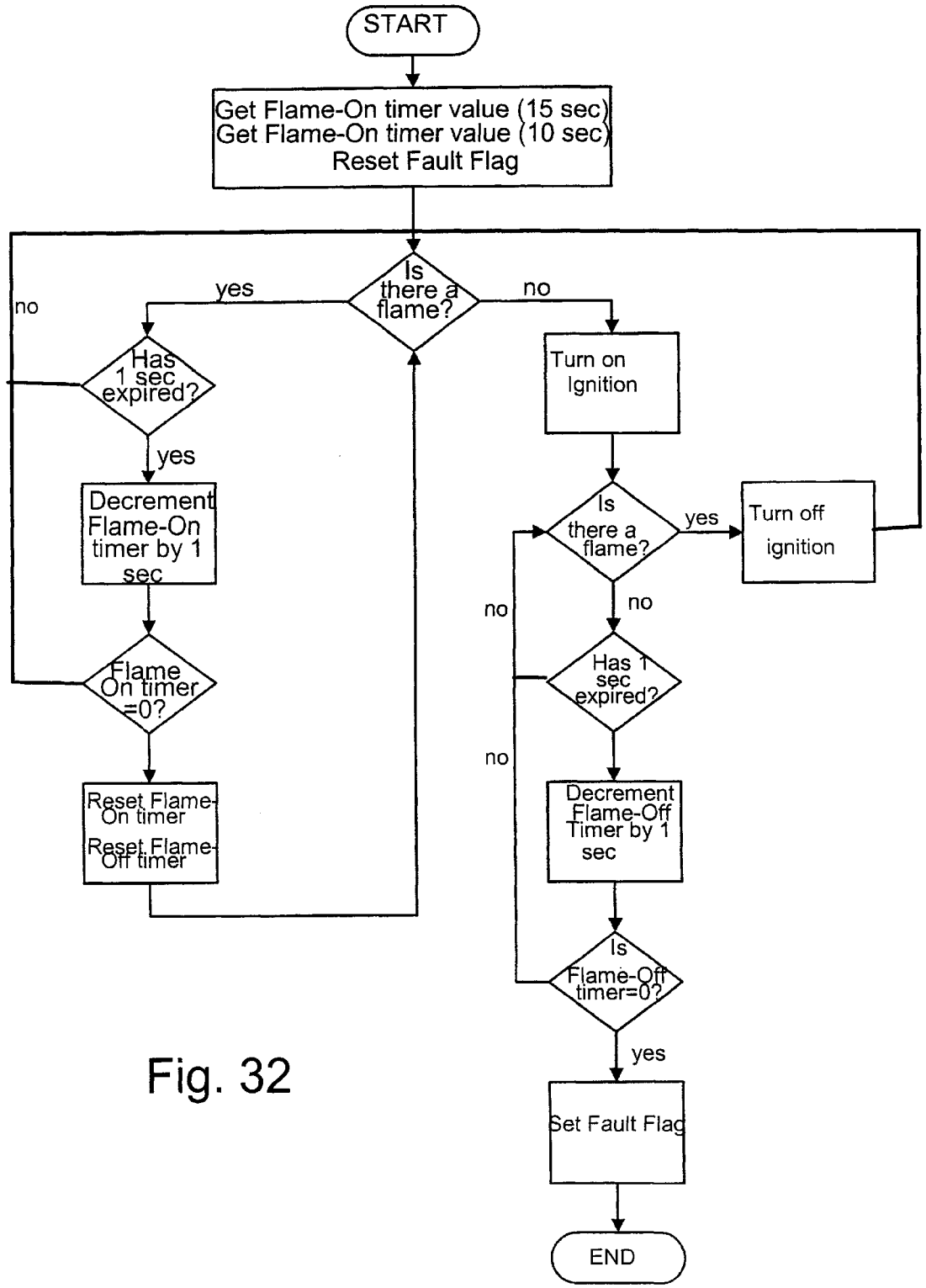
FIG. 32 is a flowchart of the system for monitoring sputtering flames and determining whether or not the heater should be shut off.

With reference to the flowchart of FIG. 32, the invention includes provision for taking care of a sputtering flame caused, for example, by air bubbles in the fuel. These air bubbles can cause the flame to sputter or go out. If this occurs, then it is necessary to restart combustion. The invention utilizes two timers, a 15 second flame-on timer and a 10 second flame-out timer. While operating, if the flame extinguishers, then the flame sensor indicates that there is no flame and this turns on the ignition. This attempts to reignite the flame. While the heater is running normally (i.e. with a flame) a flame-on timer runs as long as the heater is in the Run state. This timer is frozen in the Reignition state. The Flame-on timer and the Flame-out timer are reset when the Flame-on timer times out after being in Run state for 15 seconds.

A flame-out timer keeps track of how long the flame has been out. After being out for 10 seconds, a flame-out fault is declared. If the flame reignites, the unit returns to the Run state. The Flame-out timer is not cleared when the unit returns to the Run state rather the Flame-out timer is frozen in case the flame goes out again right away, and the system returns to the Reignition state again.

The 10 seconds for the Flame-out timer and 15 seconds for the Flame-on timer are significant. The system tolerates 10 seconds/25 seconds with the flame out. In other words, the flame may be out 40 percent of the time and the heater continues to run. Any more, then the heater will stop since this usually indicates a fault such as a leaking fitting.

The heater described above and shown in the drawings is an auxiliary heater for buses and trucks. Engine coolant is pumped through the heat exchanger which surrounds the combustion chamber. The heater burns vehicle fuel. There are two manually operated switch inputs: a main toggle/rocker switch; and a pre-heat momentary push-button switch. The unit also has two inputs that come from the engine or an electronic engine controller. There is a coolant pump input which allows the engine controller to turn the unit's coolant pump on when the unit is otherwise off. There is also a supplemental input which directs the Control module to produce supplemental heat for the passenger compartment.

The unit has control over four primary devices. The first is the blower motor which blows air through the combustion chamber and provide suction for the fuel. The air movement provides oxygen for combustion, removes exhaust gases and cools the chamber after the flame is put out. The second is the coolant pump that helps move liquid engine coolant between the input and output ports of the heat exchanger. The third is a solenoid that controls a fuel valve. The fourth is the spark ignitor used to start the fuel burning. The ignitor is turned off after the fuel starts to burn. Normally the flame continues until the supply of fuel is switched off.

The unit has additional inputs to sense the presence of a flame, measure coolant temperature, and detect over/under voltage and other faults, has additional outputs for an indicator lamp and to power auxiliary/accessory devices. Non-volatile memory is used to record hours meters and keep an event/fault log. The unit has a serial diagnostic port which allows a remote PC to access/control unit operation.

There is a heating cycle which is defined as a sequence of automatic operations by the Control module beginning with detecting temperature below the cycle on threshold and starting combustion, and ending with detecting temperature above the cycle off threshold and extinguish in combustion.

Once a heating cycle starts, there may be fuel and/or hot exhaust gases in the combustion chamber. When the heating cycle ends, whether or not it terminates successfully, the Control module continues to run the blower motor for a period of time in order to clear out in cool down the combustion chamber. This process is known as purging.

The Control module of the preferred embodiment has an RS232 communication port over which it can interact with a diagnostic program running on the standard PC.

Many aspects of the Control module operation are governed by parameters accessible and modifiable via the datalink.

The behavior of the heater is specified by a finite state machine with 16 defined states in the preferred embodiment. However the unit is considered to be operating in one of four modes discussed below.

The Normal Mode is the primary mode for the unit. Operation during this mode depends on the state of the main switch. When the main switch is on, the coolant pump runs continuously, and the burners turned on/off according to temperature set points (i.e. similar to a thermostat for a house furnace). When the main switch is off, the burners stays off, but the coolant pump runs whenever requested by the engine controller.

Supplemental mode is similar to Normal mode (with the Main switch on), except that the coolant pump does not run continuously. In Supplemental mode, the coolant pump only runs while the burner is on or when requested by the engine controller. This mode is selected by turning on the Supplemental input (while keeping the Main switch off). Supplemental mode is canceled when the Main switch is turned on.

Preheat mode is similar to the Normal mode (with the main switch on), except that it automatically shuts off after 90 minutes. Preheat mode is entered when the operator presses the Preheat pushbutton switch momentarily. The switch is only honored when both main and supplemental inputs are off. Preheat mode is canceled when either of these other switches is turned on.

There are three levels of severity of failure conditions which may occur. The first level is noncritical. Some aspect of the unit has failed, but it still can perform its basic heater function and the current heating cycle is allowed to continue.

The second level is critical. Here the unit cannot continue the current heating cycle any longer. The cycle is terminated, but another (automatic) heating cycle is permitted regardless of how many different critical faults have occurred within the cycle.

If two consecutive heating cycles are terminated in this manner, it is considered catastrophic. Here the unit cannot automatically initiate any more heating cycles. Operator intervention is required. For example, and overheat fault is considered catastrophic.

Once a fault has been recognized, and acted upon, the control module must consider the fault condition to be cleared before acting on it again. This prevents a single event from triggering repeated log entries. The control module remembers which faults are currently active and resets this memory under the following conditions:

For critical and catastrophic faults, all such faults are reset upon a transition from a class B state to a class A state. Purge, purge error, purge shutdown, purge off, shutdown and shutdown override, all discussed below, are class B states. All others are class A states.

For noncritical faults, all such faults are reset as above for critical faults and also on entry to the off state and on exit from the purge state. Again these states are discussed below.

The operation of the heater will now be explained with reference to the various operational states thereof. The operation of the heater is specified by a finite state machine (FSM) with the following states. In general all of the states monitor switch inputs for mode changes, exit Preheat mode when time expires and check for faults on given outputs and inputs of interest.

Powered Off—This represents the state of the electronic control module when it is powered off. When the power is turned on, the heater normally enters the (heater) Off state.

Off—The heater is off in this state. The electronic control module however only stops running when the power supply to the control module is disconnected. All operator switches are off and the unit is considered to be in Normal mode awaiting operator or engine control module input.

The unit is intended to be powered, normally by the vehicle battery, at all times. Therefore the heater has a low-power sleep mode while in this state. Any manual switch operation, request from the engine controller or diagnostic port connection will wake it up.

While in the Off state, the indicator light is used to show the presence or absence of the flame as detected by the flame sensor. This is to permit a service technician to verify the functionality of the flame sensor.

Ignition Check—This state occurs just after the heater has been switched on while in the Off state using the Main switch. The unit turns the ignitor on for five seconds (Ignition Check timeout parameter), allowing the service technician to verify ignitor functionality. Ignitor faults are not checked during this period. The state will terminate prematurely, and the unit returns to the Off state if the Main switch is turned off, otherwise the next state is Standby.

Standby—The unit in this state has been switched on by one of the operator switches, but the burner is not on. The unit monitors coolant temperature and initiates the process to turn on the burner when the temperature drops below a lower threshold. The coolant pump is running continuously in this state. The state may occur in any of the three operating modes. However the only way it can occur in Supplemental mode is if the engine controller requests that the coolant pump run.

Standby Supp—This state is only for Supplemental mode. It is similar to the Standby state except that the coolant pump is off. The engine controller does not request the coolant pump to run. If the engine controller does request the coolant pump, then the unit changes to Standby stage. If the burner needs to be turned on, the unit goes to the Prerun state.

Prerun—This state occurs only for the Supplemental mode. The purpose of this state is to run the coolant pump for thirty seconds. It then checks if the temperature sensed still requires the burner to be turned on. This is because the coolant pump has been off and the unit may not be reading the true coolant temperature. The heat from the engine itself may be sufficient and there may be no need to turn on the burner.

Precheck—This is the first of a sequence of states the unit goes through to turn on the burner. Power is applied to the ignition module, but sparking is not enabled. The state lasts about 0.5 seconds, giving the unit time to check for a few types of fault conditions. The checks performed include:

is the flame already on? (May indicate a faulty flame sensor)

are the temperature sensors okay?

is there an overheat condition (combustion chamber too hot)?

is system voltage within acceptable operating range?

are there ignition module, fuel solenoid or coolant pump faults present?

Preignition—This is the second of a sequence of states turn on the burner. The blower motor is turned on and ignition module sparking is enabled at this point. The fuel valve is kept closed. The state lasts for about five seconds, giving the unit time to verify motor startup and detect ignition module faults.

Ignition—This is a third of a sequence of states that the unit goes through to turn on the burner. The fuel valve is opened at this point. The objective is to ignite the fuel. The state lasts about thirty seconds. During this interval, in addition to the usual array of fault conditions, the unit monitors whether the flame is out. At the end of this interval, if the flame had not been on sufficiently long enough (see Start Criteria parameter), then the sequence is aborted because the burner failed to start.

Run—This is the final state in the sequence the unit goes through to turn on the burner. Ignition module sparking is turned off at this point. Fuel should continue to burn. The unit remains in the state until coolant temperature reaches the upper threshold, the Main or Supplemental switch is turned off, or some critical fault is detected. Should the flame go out, the unit attempts reignition by going to the Reignition state. When it is time to terminate the current heating cycle, the unit goes into one of the Purge states to clear the combustion chamber of exhaust gases and cool it down.

Reignition—When the flame goes out during the Run state, the unit attempts to reignite it in this state. Ignition module sparking is re-enabled. The state lasts for up to ten seconds or until a flame is sensed again. A flame-out timeout timer keeps track of how long the flame has been out. After being out for ten seconds, a flame-out fault is registered. If the flame reignites, the unit returns to the Run state with sparking off. The Reignition flame-out timeout timer is not cleared when the unit returns to the Run state. Rather the Reignition flame-out timeout timer is frozen in case the flame goes out again right away, and the heater returns to the Reignition state again. The second timer known as the Reignition flame timeout timer runs only in Run state (and is frozen while in Reignition state). The reignition flame timeout timer is reset when the Reignition flame timeout timer times out (after being in the Run state 15 seconds), the Reignition flame timeout timer also restarts.

Purge/Purge Off/Purge Error/Purge Shut down—After the burner is turned off at the end of the heating cycle, the combustion chamber is cleared of exhaust gases and cooled by running the blower motor for about 2 minutes. There are four variations of the Purge state, depending on how the cycle ended and what the state of the unit will be after the purging is completed.

Purge—normal termination of heating cycle because upper temperature threshold was reached. Unit remains in current operating mode with next state being Standby.

Purge Off—normal termination of heating cycle because operator switched off the unit or Pre-heat interval timed out. After purge period expires, unit goes to Off state in Normal mode.

Purge Error—heating cycle terminated due to a critical failure. While purging, an error code is displayed on the indicator, but after the purge period expires. The unit remains in its current operation mode with the next state being Standby.

Purge Shutdown—heating cycle terminated due to a catastrophic failure. An error code is displayed on the indicator, and after the purge period expires, the next state is Shutdown (the error code continues to be displayed).

When the blower motor is on during a purge state, it is important that the blower be kept running if possible to adequately cool the burner and vent exhaust gases and unburnt fuel. About one second after a blower motor fault, the motor output is retried. Blower motor PWM gradually ramps up to the target motor speed. This may take several seconds. There is one exception to this motor retry while in purge strategy, namely if the flame sensor detects a flame (see Purge flame timeout parameter), then the motor is turned off (and not retried) in an attempt to extinguish the flame.

Shutdown—The unit in the state has automatically turned itself off due to a catastrophic failure. The unit remains in this (or C.P. Override) state until operator presence is indicated by switch operation. If Main and/or Supplemental switches were on at the time of failure, the operator must switch them both off. If the Preheat mode was active at the time of failure (Main and Supplemental switches must have been off), the operator must turn the Main or Supplemental switch on (This does not engage the heater in the corresponding mode, rather the unit stays in Shutdown state, but no longer considers itself in Reheat mode.) and off again. The unit then returns to Off state in Normal mode.

C.P. Override (Shutdown Override)—While the unit is in Shutdown state, the engine controller can still request that the coolant pump run. The state is essentially identical to Shutdown except the coolant pump is turned on. When the engine controller removes its request, the unit returns to Shutdown state. If there is a coolant pump failure, it is retried every 10 seconds.

C.P. Run (Off Override)—While the unit is in Off state, the engine controller can still request that the coolant pump run. The state is essentially identical to Off state, except the coolant pump is turned on. When the engine controller removes its request, the unit returns to Off state. If there is a coolant pump failure, it is retried every 10 seconds.

It will be understood by someone skilled in the art that many of the details provided above are by way of example only and can be altered or deleted without departing from the scope of the invention which is to be interpreted with reference to the following claims.

What is claimed is:

1. A method of maintaining a temperature between a first temperature value and a second, variable temperature value, the method utilizing a heat transfer device capable of cycling through a series of cycles, the device being capable of changing the temperature from the second value to the first value when operational, during each said cycle the device transferring heat for a first period of time when the temperature reaches the second value until the first value is reached and thereafter the device ceasing to transfer heat, said first period of time being compared to a desired cycle-on period of time during each said cycle and said second value then being adjusted for a subsequent cycle of the device so said first period of time when the device transfers heat approaches said desired cycle-on period of time.

2. The method as claimed in claim 1, wherein the device is a heater and the first value is higher than the second value.

3. The method as claimed in claim 2, wherein the heater has a burner, the burner becoming operational when the second temperature value is reached and becomes nonoperational when the first temperature value is reached.

4. The method as claimed in claim 3, the device being a fluid heater and the first value, and the second value being temperatures of a fluid heated by the heater.

5. The method as claimed in claim 4, wherein the fluid is an aqueous solution including water and anti-freeze.

6. The method as claimed in claim 5, wherein the heater is a transit vehicle heater.

7. The method as claimed in claim 3, wherein the second temperature value is increased after each cycle where the first period of time exceeds the desired cycle-on period of time.

8. The method as claimed in claim 7, wherein the second temperature value is decreased after each cycle where the desired cycle-on period of time exceeds the first period of time.

9. The method as claimed in claim 3, wherein the heater becomes operational for another cycle after the heater is nonoperational for a preselected period of time, whether or not the second temperature is reached.

10. An apparatus for maintaining a temperature between a first temperature value and a second temperature value, the apparatus including a heat transfer device capable of cycling through a series of cycles, the device being capable of changing the temperature from the second value to the first value when operational, and controls which control the device so during each said cycle the device transferring heat for a first period of time when the temperature reaches the second temperature value until the first value is reached and thereafter the device ceases transferring heat, said controls comparing the first period of time to a desired cycle-on period of time during each said cycle and said controls adjusting the second temperature value for a subsequent cycle of the device so said first period of time when the device transfers heat approaches said desired cycle-on period of time.

11. The apparatus as claimed in claim 10, wherein the device is a heater and the first value is higher than the second value.

12. The apparatus as claimed in claim 11, wherein the heater has a burner, the burner becoming operational when the second temperature value is reached and becomes nonoperational when the first temperature value is reached.

13. The apparatus as claimed in claim 1, the device being a fluid heater and the first value and the second value being temperatures of a fluid heated by the heater.

14. The apparatus as claimed in claim 1, wherein the fluid is an aqueous solution including water and anti-freeze.

15. The apparatus as claimed in claim 13, wherein the heater is a transit vehicle heater.

16. The apparatus as claimed in claim 13, wherein the controls increase the second temperature value after each cycle where the first period of time exceeds the desired cycle-on period of time.

17. The apparatus as claimed in claim 1, wherein the controls decrease the second temperature value after each cycle where the desired cycle-on period of time exceeds the first period of time.

18. The apparatus as claimed in claim 13, wherein the controls cause the heater to become operational for another cycle after the heater is nonoperational for a preselected period of time, whether or not the second temperature value is reached.

19. A heater for a liquid including controls for maintaining a temperature of the liquid between a first value and a second lower value, the heater being capable of cycling through a series of cycles, the controls controlling the heater so during each said cycle the heater heats for a first period of time when the liquid cools to the second temperature value until the liquid is heated to the first value and thereafter the heater stops heating, said controls comparing the first period of time to a desired cycle-on period of time during each said cycle and said controls adjusting the second temperature value for a subsequent cycle of the device so said first period of time when the heater heats approaches said desired cycle-on period of time.

20. The heater as claimed in claim 19, wherein the heater has a burner, the burner becoming operational when the second temperature value is reached and becomes nonoperational when the first temperature value is reached.

21. The heater as claimed in claim 19, wherein the liquid is an aqueous solution including water and anti-freeze.

22. The heater as claimed in claim 19, wherein the heater is a transit vehicle heater.

23. The heater as claimed in claim 19, wherein the controls increase the second temperature value after each cycle where the first period of time exceeds the desired cycle-on period of time.

24. The heater as claimed in claim 19, wherein the controls decrease the second temperature value after each cycle where the desired cycle-on period of time exceeds the first period of time.

25. The heater as claimed in claim 19, wherein the controls cause the heater to commence heating for another cycle after the heater has stopped heating for a preselected period of time, whether or not the second temperature value is reached.

26. The heater as claimed in claim 19, wherein the controls include a temperature sensor.

27. The heater as claimed in claim 19, wherein the controls include a programmable control module.

28. A control system for a heat transfer device, the control system maintaining a temperature between a first value and a variable second value, the heat transfer device being capable of cycling through a series of cycles, the device being capable of changing the temperature from the second value to the first value, the control system controlling the device so during each said cycle the device transfers heat for a first period of time when the temperature reaches the second temperature value until the first value is reached and thereafter the device stops transferring heat, said controls comparing the first period of time to a desired cycle-on period of time during each said cycle and said control system adjusting the second temperature value for a subsequent cycle of the device so said first period of time when the device transfers heat approaches said desired cycle-on period of time.

29. The control system as claimed in claim 28, wherein the device is a heater and the first value is higher than the second value.

30. The control system as claimed in claim 28, wherein the heater has a burner, the burner becoming operational when the second temperature value is reached and becomes nonoperational when the first temperature value is reached.

31. The control system as claimed in claim 30, the device being a fluid heater, the first value and the second value being temperatures of a fluid heated by the heater.

32. The control system as claimed in claim 28, wherein the heater is a transit vehicle heater.

33. The control system as claimed in claim 28, wherein the control system increases the second temperature value after each cycle where the first period of time exceeds the desired cycle-on period of time.

34. The control system s as claimed in claim 28, wherein the control system decreases the second temperature value after each cycle where the desired cycle-on period of time exceeds the first period of time.

35. The control system as claimed in claim 28, wherein the control system causes the heater to heat for another cycle after the heater stops heating for a preselected period of time, whether or not the second temperature value is reached.

36. The control system as claimed in claim 28, including a temperature sensor and a programmable control module.

* * * * *